United States Patent [19]
Hó et al.

[11] Patent Number: 5,866,315
[45] Date of Patent: Feb. 2, 1999

[54] SILVER HALIDE PHOTOGRAPHIC LIGHT SENSITIVE MATERIAL

[75] Inventors: Socman Hó; Nobuaki Kagawa; Noriyasu Kita, all of Hino, Japan

[73] Assignee: Konica Corporation, Japan

[21] Appl. No.: 859,640

[22] Filed: May 20, 1997

[30] Foreign Application Priority Data

May 24, 1996 [JP] Japan ................................ 8-129770

[51] Int. Cl.$^6$ ................................ G03C 1/14; G03C 1/34
[52] U.S. Cl. ........................ 430/583; 430/569; 430/585; 430/588; 430/607; 430/611
[58] Field of Search ........................ 430/583, 588, 430/585, 611, 607, 629, 604, 569, 567

[56] References Cited

U.S. PATENT DOCUMENTS

| | | | |
|---|---|---|---|
| 3,769,025 | 10/1973 | Ohkubo et al. | 430/588 |
| 4,675,279 | 6/1987 | Shuto et al. | 430/567 |
| 5,229,264 | 7/1993 | Patzold et al. | 430/600 |
| 5,424,168 | 6/1995 | Fujita et al. | 430/217 |
| 5,679,508 | 10/1997 | Mucke et al. | 430/600 |

FOREIGN PATENT DOCUMENTS 0768568  4/1997  European Pat. Off. .

OTHER PUBLICATIONS

European Search Report EP 97 30 3562.

*Primary Examiner*—Thorl Chea
*Attorney, Agent, or Firm*—Jordan B. Bierman; Bierman, Muserlian and Lucas

[57] ABSTRACT

A silver halide photographic light sensitive material is disclosed, comprising a support having thereon a silver halide emulsion layer comprising a silver halide emulsion, wherein the silver halide emulsion comprises silver halide grains having an average iodide content of 0 to 1 mol %, at least 50% of total grain projected area is accounted for by tabular grains having an aspect ratio of 2 to 20; and the silver halide grains being spectrally sensitized with a sensitizing dye represented by the following formula (1) or (2):

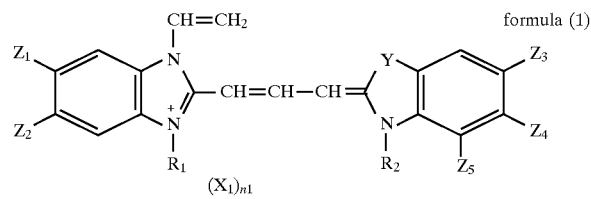

formula (1)

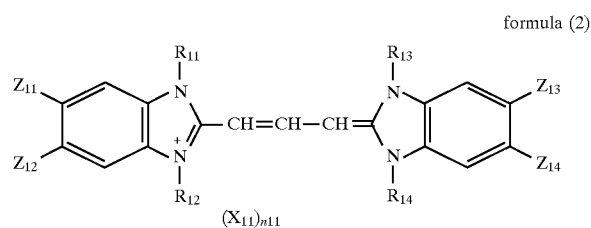

formula (2)

11 Claims, 1 Drawing Sheet

SILVER HALIDE PHOTOGRAPHIC LIGHT SENSITIVE MATERIAL

FIELD OF THE INVENTION

The present invention is related to a silver halide photographic light sensitive material, a photographing method by use thereof and a processing method thereof, and particularly to a silver halide photographic light sensitive material for medical use which exhibits negligible dye stains, superior in storage stability and pressure resistance and has high sensitivity, a photographing method by use thereof and a processing method thereof.

BACKGROUND OF THE INVENTION

Recently, with regard to processing of a silver halide photographic light sensitive material (hereinafter, simply referred to as photographic material), shortening of processing time has been demanded. In the field of X-ray films for medical use, the amount of X-ray photographing is rapidly increasing due to increased use of X-rays for diagnosis and inspection in general medical examinations, as well as the increased tendency for periodical medical check-ups and clinical surveys. As a result, the desire for still faster processing is raised.

Shortening of processing time including developing, fixing, washing, drying, etc. is the key for faster processing of photographic materials. Shortening of the developing time alone, however, leads to a marked decrease of image density and sensitivity and deterioration of contrast. Shortening of only the fixing time leads to insufficient fixing, causing deterioration of image quality. Furthermore, shortening the time of each processing step results in incomplete dye leaching out of the processed material, causing stains due to residual dye.

To overcome these problems, it is basically required to enhance developability and fixability of the photographic material, reduce the content of the dye and promote release or decoloration of the dye.

To prevent dye stains, as is well known, it is effective to reduce the binder content. However, reduction of the binder results in marked deterioration in pressure resistance or causes problems such that when being subjected to rapid processing, abrasion marks are produced by the rollers of an automatic processor, or when being bent, pressure fogging or pressure desensitization occurs.

For environmental protection, reduction of processing effluent is required, and therefore, reduction of the amount of processing solutions and replenishing solutions or exhaustion of the processing solutions is required. In this case, however, various problems also occur similarly to the case of the above-described rapid-processing.

As techniques for solving these problems, for example, examined Japanese Patents 43-4931 and 44-16589, EP-0,506,584 (hereinafter, the term, "EP" refers to European Patent) and JP-A 5-88293 and 5-93975 (hereinafter, the term, "JP-A" refers to unexamined and published Japanese Patent Application) disclose a technique of using, as a sensitizing dye, benzimidazolo-carbocyanines which are superior in decolorizability. JP-A 5-61148 discloses a technique in which a combination of an oxacarbocyanine and benzimidazolocarbocyanine is used in a specific proportion, in a silver halide emulsion containing 1 mol % or less iodide and the silver halide emulsion is further chemically sensitized with a selenium compound and/or tellurium compound.

The dye stain reduction and rapid-processability can be improved by these techniques, but it is not insufficient to satisfy other desired levels. Specifically, since the absorption maximum of a photographic material is in a longer wavelength region and sensitivity to red light is too high, fogging due to safe-light is markedly increased. Furthermore, another defect is that when aged under high temperature and high humidity, the decrease in sensitivity is marked.

There have been made a variety of basic studies with regard to the relationship between the surface of silver halide grains and adsorption of sensitizing dyes. Phot. Sci. Eng. 18 215–225 (1974) describes that when a sensitizing dye is adsorbed to silver halide grains having (100) faces, desensitization in intrinsic sensitivity of the silver halide grains is small. It is also described that when chemical sensitization is carried out in the presence of a sensitizing dye, the chemical sensitization is controllable and desensitization in intrinsic sensitivity can be reduced. However, these techniques suggest nothing with respect to the technique of pressure resistance.

Silver halide photographic light sensitive materials generally have characteristics relating to intensity reciprocity law failure and the characteristics are variable, depending on properties of processing solutions. Specifically, low intensity reciprocity law failure is easily affected by developing agents, which results in a problem that when exposed over a long period of time, the decrease in sensitivity is markedly large, and therefore improvement in this art has been greatly desired.

Also, in the field of photographic materials for medical use, simplification and security of overall processing are being promoted to enhance working efficiency. With regard to processing chemicals, one conventional system is that a commercially available condensed processing solution is diluted to a given amount and the resulting solution is supplied as a replenisher to the processing tank of an automatic processor. As a result, the processing solution is massive in weight and volume, with the inherent disadvantages that enhancement in efficiency and safety of processing is difficult to achieve. Instead thereof, recently, there was proposed a system of solid processing chemicals, in which the processing chemicals are supplied in the form of a solid processing composition and diluent water. With this system, there have been achieved improvements in working efficiency as well as lowering of transportation cost and reduction of storage space. In addition, the amount of packaging material such as plastic resin, was advantageously reduced.

However, this system still has problems such that as processing chemicals are solid composition, its solubility (dissolution speed) is concerned and when subjected to ultra-high speed processing, stable running performance can not be achieved.

In developer used for black-and-white photographic light sensitive materials, dihydroxybenzenes such as hydroquinones have been conventionally employed as a developing agent. Recently, it was proposed to substitute ascorbic acids for the developing agent in terms of improvements in safety of working and environmental protection; for example, U.S. Pat. No. 5,236,816 discloses developing solutions employing ascorbic acid.

However, the developing solutions employing ascorbic acids are lower in activity and worse in aging deterioration than those which use hydroquinones, resulting in disadvantages that stable photographic performance can not be realized. There has been desired a silver halide photographic material developable with a developing agent such as ascorbic acid, and eliminating use of hydroquinones.

SUMMARY OF THE INVENTION

It is an object of the present invention to provide a silver halide photographic light sensitive material producing no or negligible dye stains, improved in aging stability and safe-light safety characteristics and with high sensitivity and also to provide a silver halide photographic light sensitive material improved in low intensity reciprocity law failure and little development unevenness.

It is another object of the invention to provide a silver halide photographic light sensitive material which is developable even by use of a solid developing composition or ascorbic acids as a developing agent and a processing method thereof. It is still another object to provide a silver halide photographic light sensitive material for use in medical radiography with the above-described performance, and a photographing method by use thereof.

The above objects can be accomplished by the following constitutions.

(1) A silver halide photographic light sensitive material comprising a support having thereon a silver halide emulsion layer, characterized in that said silver halide emulsion comprises silver halide grains having an average iodide content of 0 to 1 mol %, and 50 to 100% of the total grain projected area of the emulsion being accounted for by tabular grains having an aspect ratio of 2 to 20; said silver halide grains being spectrally sensitized with a sensitizing dye represented by the following formula (1):

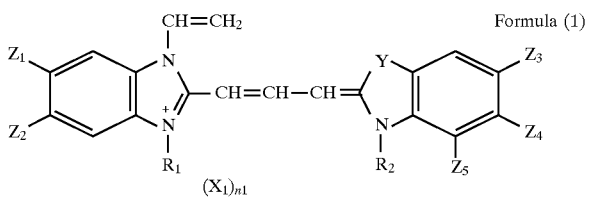

Formula (1)

wherein Y represents a oxygen atom or >NR; R, $R_1$ and $R_2$ each represent a lower alkyl group, provided that at least one of $R_1$ and $R_2$ is a lower alkyl group substituted by a hydrophilic group; $Z_1$, $Z_2$, $Z_3$, $Z_4$ and $Z_5$ each represent a hydrogen atom or a substituent, and $Z_3$ and $Z_4$ or $Z_4$ and $Z_5$ may be linked to each other to form a condensed ring, provided that at least one of $Z_1$ and $Z_2$ is an electron attractive group; $X_1$ represents an ion necessary for neutralizing intramolecular charge; and n1 is an integer of 0 to 5, provided that n1 is 0 when the dye forms an inner salt.

(2) A silver halide photographic light sensitive material comprising a support having thereon a silver halide emulsion layer, characterized in that said silver halide emulsion comprises silver halide grains having an average iodide content of 0 to 1 mol %, and 50 to 100% of the total grain projected area of the emulsion being accounted for by tabular grains having an aspect ratio of 2 to 20; said silver halide grains being spectrally sensitized with a sensitizing dye represented by the following formula (2):

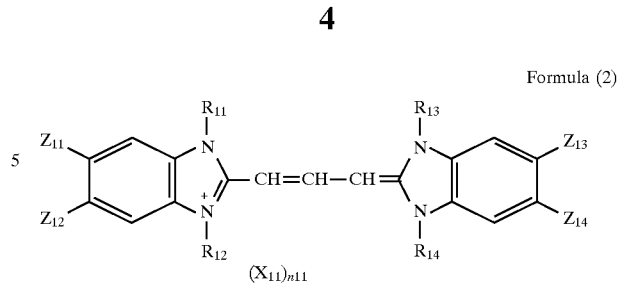

Formula (2)

wherein $R_{11}$ and $R_{13}$ each represent a lower alkyl or alkenyl group, provided that at least one of $R_{11}$ and $R_{13}$ is a vinyl ($-CH=CH_2$); $R_{12}$ and $R_{14}$ each represent a lower alkyl group, provided that at least one of $R_{12}$ and $R_{14}$ is an alkyl group substituted by a hydrophilic group; $Z_{11}$, $Z_{12}$, $Z_{13}$ and $Z_{14}$, which may be the same or different, each represent a hydrogen atom, a halogen atom, a cyano group, an alkyl group, an alkoxy group, a halogenated alkoxy group, an aryloxy group, an acyl group, an acyloxy group, an alkylthio group, a halogenated alkylthio group, an alkoxy group, a carbamoyl group, a sulfamoyl group, a hydroxy group, a halogenated alkyl group, a carboxy group, sulfonyl group, an acylamino group, a heterocyclic group or an aryl group; $X_{11}$ represents an ion necessary for neutralizing intramolecular charge; and n1 represents an integer of 0 or more, provided that n1 is 0 when the dye forms an inner salt.

(3) The silver halide photographic light sensitive material described in (1) or (2), characterized in that said silver halide photographic light sensitive material having a silver halide emulsion containing silver halide grains spectrally sensitized with a sensitizing dye has an absorption maximum in a wavelength region of 530 to 560 nm.

(4) The silver halide photographic light sensitive material described in (1) to (3), characterized in that said silver halide grains are prepared in the presence of a silver solvent.

(5) The silver halide photographic light sensitive material described in (1) to (3), characterized in that said silver halide contain 20 to 100 mol % chloride and at least a metal ion selected from the group consisting of metals of VIII group of the periodic table, transition metals of II group of the periodic table, lead, rhenium, molybdenum and chromium.

(6) The silver halide photographic light sensitive material described in claims (1) to (5), characterized in that said photographic material contains a compound represented by the following formula (3):

$R_{21}-(S)_m-R_{22}$                Formula (3)

wherein $R_{21}$ and $R_{22}$, which may be the same or different, each represent an aliphatic group, an aromatic group, a heterocyclic group or an atomic group capable of being combined together with each other to form a ring; and m is an integer of 2 to 6.

(7) A processing method for a silver halide photographic light sensitive material, characterized in that said silver halide photographic light sensitive material described in (1) to (6), after being exposed, processed by an automatic processor and a total processing time including the process of developing, fixing, washing and drying is 5 to 30 sec.

(8) A processing method for a silver halide photographic light sensitive material, characterized in that said silver halide photographic light sensitive material described in (1) to (6) is continuously processed by an automatic processor with replenishing processing chemicals in the form of solid to each of processing solutions.

(9) A photographing method of a silver halide photographic light sensitive material, characterized in that said silver halide photographic light sensitive material described in (1) to (6) which is sandwiched between high-sensitive intensifying screens and subjected to X-ray photographing.

DETAILED DESCRIPTION OF THE INVENTION

Figure 1:
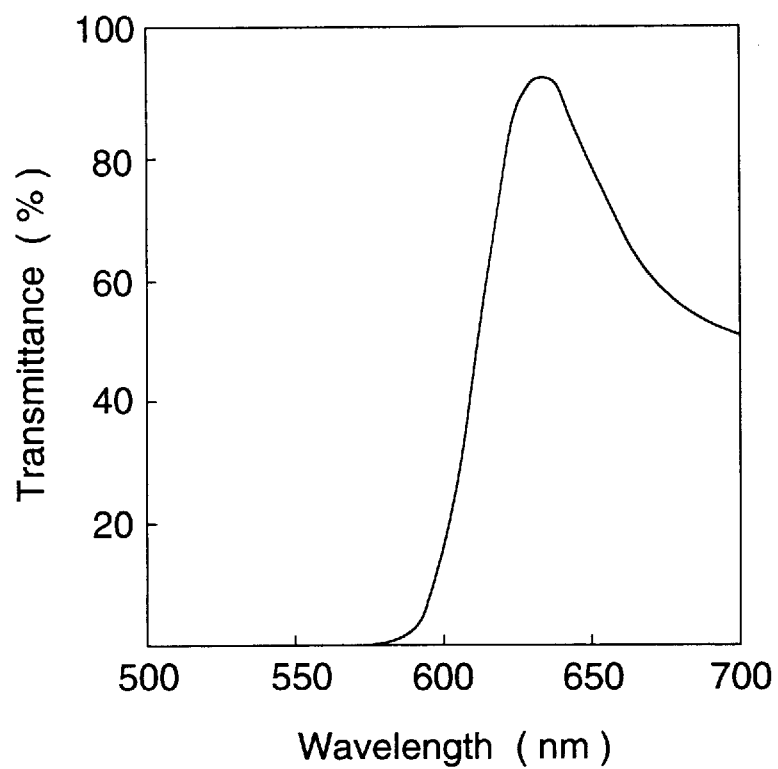
FIG. 1 shows light transmittance of a red filter used in evaluation of safelight safety.

An embodiment of silver halide photographic light sensitive materials according to the invention is one having, on one side of a support, a light sensitive silver halide emulsion layer. The total silver coverage per one side 0.5 to 1.60 g/m$^2$ and preferably 1.0 to 1.50 g/m$^2$. The silver halide emulsion layer can be provided on one side or both sides of the support.

The silver halide grains according to the invention may comprise silver chloride, silver bromide, silver iodochloride, silver iodochlorobromide, silver chlorobromide or silver iodobromide. In one embodiment of the present invention is preferred silver bromide, silver iodobromide or silver iodochlorobromide. In another embodiment of the invention is preferred silver chloride, silver chlorobromide or silver iodochloride. In the latter case, silver halide grains according to the invention is those containing preferably 20 mol % or more, more preferably 70 mol % or more and furthermore preferably 90 mol % or more chloride.

The tabular silver halide grains used in the invention have an average overall iodide content of 1 mol % or less, preferably 0 to 0.5 mol %, and more preferably 0.01 to 0.3 mol %.

The tabular, chloride-containing silver halide grains used in the invention have an average overall bromide content of 2.0 mol % or less, preferably 0 to 0.15 mol %, and more preferably 0 to 0.1 mol %.

As a method for forming an iodide-containing phase according to the invention, a method in which a silver nitrate aqueous solution and iodide ion containing aqueous solution were simultaneously added into an emulsion containing tabular grains as substrate, a method in which silver halide fine grains such as silver iodide, silver iodobromide or silver iodochlorobromide and a method in which potassium iodide or a mixture of potassium iodide and potassium bromide is added are applicable. Among these, the method in which silver halide fine grains are added are preferred. An addition of silver iodide fine grains is particularly preferred.

In the silver halide tabular grains according to the invention, the iodide may be contained in any portion of the grain. The iodide is preferably contained in the outermost surface of the grain. The expression, "the outermost surface" refers to a period of from the time of completion of grain growth to the time of completion of chemical ripening.

The iodide content of each grain and an average iodide content of overall grains can be determined by means of EPMA (Electron Probe Micro Analyzer). In this method, a sample which is prepared by dispersing silver halide grains so as not to be contact with each other, is exposed to an electron beam to conduct X-ray analysis by excitation with the electron beam. Thereby, elemental analysis of a minute portion can be done. Thus, halide composition of each grain can be determined by measuring intensities of characteristic X-ray emitted from each grain with respect to silver and iodide. At least 50 grains are subjected to the EPMA analysis to determine their iodide contents, from which the average iodide content can be determined.

It is preferred that the silver halide tabular grains according to the invention have uniformly iodide contents among grains. When the iodide content of grains is determined by the EPMA analysis, a relative standard deviation thereof (i.e., a variation coefficient of the iodide content of grains) is 35% or less, preferably, 20% or less.

The tabular silver halide grains according to the invention account for 50% or more of the grain projected area of the total grains contained in a silver halide emulsion layer of a photographic material, and having an average aspect ratio (grain diameter/grain thickness) of 2 to 20, preferably 2 to 12 and more preferably, 3 to 8. The grain diameter is its equivalent circular diameter (i.e., the diameter of a circle having an area equivalent to the projected area of the grain). The grain thickness is referred to as a distance between two parallel major faces.

The tabular silver halide grains are preferably monodispersed. In other words, a width of grain size distribution is preferably 25% or less, further preferably, 20% or less and furthermore preferably, 15% or less. The width of the grain size distribution is defined in a relative standard deviation (variation coefficient) of the grain diameter, which is expressed as;

width of grain size distribution (%)=(standard deviation of grain diameter/average grain diameter)×100.

It is also preferred that the tabular silver halide grains be small in grain thickness distribution. In other words, a width of grain thickness distribution is preferably 25% or less, more preferably, 20% or less and furthermore preferably, 15% or less. The width of the grain thickness distribution is defined in a relative standard deviation (variation coefficient) of the grain thickness, which is expressed as;

width of grain thickness distribution (%)=(standard deviation of grain thickness/average grain thickness)×100.

In one embodiment of the invention, the tabular silver halide grains is preferably hexagonal. The hexagonal tabular silver halide grains (hereinafter, sometimes, referred to as hexagonal tabular grains) have hexagonal major faces (which are comprised of (111) faces), and a maximum adjacent edge ratio of the major faces being 1.0 to 2.0. The expression, "maximum adjacent edge ratio" is referred to as a ratio of a maximum length of edges of the hexagonal major face to a minimum edge length. In the invention, if the hexagonal tabular silver halide grains have a maximum adjacent edge ratio of 1.0 to 2.0, the corner of the grain may be roundish. In the case of being roundish, the edge length is defined as a distance between crossing points of an extended straight line of the edge and that of an adjacent edge. The corner may disappear, resulting in round grains. It is preferred that ½ or more of each edge of the hexagonal tabular grains is substantially straight. The a maximum adjacent edge ration is preferably 1.0 to 1.5.

The silver halide solvent used in the invention includes (a) organic thioethers described in U.S. Pat. Nos. 3,271,157, 3,531,289 and 3,574,628, and JP-A 54-1019 and 54-158917; (b) thiourea derivatives described in JP-A 53-82408, 55-77737 and 55-2982; (c) silver halide solvents having a thiocarbonyl group which is between an oxygen or sulfur atom and a nitrogen atom, as described in JP-A 53-144319; (d) imidazoles described in JP-A 54-100717 (e) sulfites and thiocyanates. In addition thereto, silver halide solvents described in JP-A 57-196228 may be usable. Exemplary compounds of the silver halide solvent are shown as below.

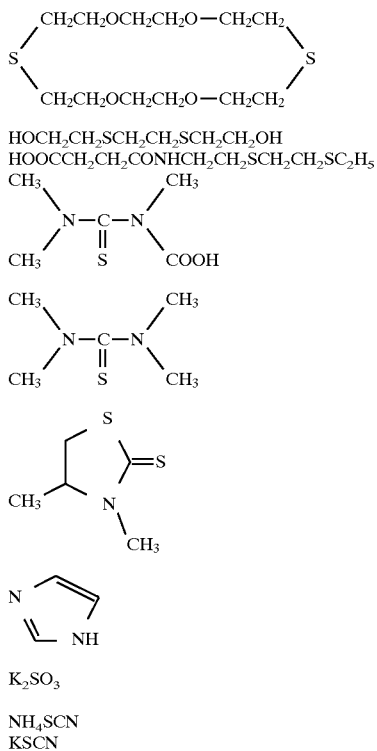

(S-1)

(S-2)

(S-3)

(S-4)

(S-5)

$K_2SO_3$ (S-6)

$NH_4SCN$ (S-7)
$KSCN$ (S-8)

Among the solvents, a thiocyanate and tetramethylthiourea are preferred. The thiocyanate includes a thiocyanate metal salt or ammonium thiocyanate. In the case of the metal salt, a metal which has no disadvantageous effect on photographic performance is preferred and a potassium or sodium salt is more preferred. A scarcely water-soluble salt such as silver thiocyanate may be added in the form of fine particles. The silver halide solvent may be added at any time during the course of preparing silver halide grains. It is preferably added prior to desalting. Addition amounts depend on the kind of the solvent. A thiocyanate, for example, is added during the course of grain formation to completion of chemical ripening, in a total amount of not less than $2.5 \times 10^{-3}$ to less than $5 \times 10^{-2}$ mol per mol of silver halide. The tabular silver halide grains contain 1.0 mol % or less, preferably, 0.5 mol % or less and more preferably, 0.4 mol % or less iodide. The iodide is formed in the presence of a silver halide solvent. It is preferred that 0.4 mol % or less of iodide is formed, in the presence of a silver halide solvent, prior to a desalting step and 0.6 mol % or less of iodide is formed, in the presence of a silver halide solvent, during chemical ripening.

In the invention, in cases when using tabular silver halide grains having (100) major faces, the major faces is in the form of a right-angled parallelogram or one having round corner(s). An adjacent edge ratio of the right-angled parallelogram is less than 10, preferably, less than 5 and more preferably, less than 2. In the case of the corner being roundish, the edge length is defined as a distance between crossing points of an extended straight line of the edge and that of an adjacent edge. The corner may disappear, resulting in round grains. The tabular silver halide grains may contains chloride in an amount of 20 mol % or more, preferably 70 mol % or more and furthermore preferably 90 mol % or more chloride. The iodide content is 1.0 mol % or less and preferably, 0.5 mol % or less.

The tabular silver halide grains may contain dislocation. The dislocation can be directly observed by using a transmission electron microscope at a low temperature, as described in J. F. Hamilton, Phot. Sci. Eng., 57 (1967) and Shiozawa, J. Soc. Phot. Sci. Japan, 35, 213 (1972). Thus, silver halide grains which are taken out from an emulsion without applying pressure in an extent of causing dislocation within the grain, are placed on a mesh for use in electron-microscopic observation and observed by a transmission electron microscope under cooling conditions for preventing damage due to the electron beam (e.g., print-out). In view of the fact that the thicker the grain is, the harder transmission of the electron beam becomes, the use of a high voltage type (i.e., 200 kV or more per 0.25 μm in grain thickness) electron microscope is preferred for definite observation.

During the course of forming silver halide grains used in the invention, silver nuclei can be formed. The silver nuclei can be formed by adding a reducing agent to an emulsion or a mixing solution used for grain growth; or by causing grains to grow or ripen at a low pAg of 7 or less or a high pH of 7 or more. A combination these methods is a preferred embodiment of the invention.

As a technique for forming silver nuclei, reduction sensitization has been known, as described in J. Phot. Sci. 25, 19–27 pages (1977) and Phot. Sci. Eng. 32, 113–117 pages (1979). As described by Michell and Lowe in Photo. Korr. Vol 1, 20 (1957) and Phot. Sci. Eng. 19, 49–55 (1975), it has been considered that silver nuclei formed through reduction sensitization contribute sensitization through the following reaction on exposure:

$$AgX + h\nu \rightarrow e^- + h^+ \quad (1)$$

$$Ag_2 + h^+ Ag^+ + Ag \quad (2)$$

$$Ag \rightarrow Ag^+ + e^- \quad (3)$$

wherein $h^+$ and $e^-$ represent a free hole and a free electron produced upon exposure, hν represents a photon and $Ag_2$ represents a silver nucleus formed through reduction sensitization.

Preferred reducing agents include thiourea dioxide, ascorbic acid and its derivative, and a stannous salt. In addition, borane compounds, hydrazine derivatives, formamidine-sulfinic acid, silane compounds, amines or polyamines, and sulfites are also appropriate reducing agents. The reducing agent is added in an amount of $10^{-2}$ to $10^{-8}$ mol per mol of silver halide.

To carry out ripening at a low pAg, there may be added a silver salt, preferably aqueous soluble silver salt. As the aqueous silver salt is preferably silver nitrate. The pAg in the ripening is 7 or less, preferably 6 or less and more preferably 1 to 3 (herein, pAg=–log [$Ag^+$]).

Ripening at a high pH is conducted by adding an alkaline compound to a silver halide emulsion or mixture solution for growing grains. As the alkaline compound are usable sodium hydroxide, potassium hydroxide, sodium carbonate, potassium carbonate and ammonia. In a method in which ammoniacal silver nitrate is added for forming silver halide, an alkaline compound other than ammonia is preferably employed because of lowering an effect of ammonia.

The silver salt or alkaline compound may be added instantaneously or over a period of a given time. In this case, it may be added at a constant rate or accelerated rate. It may be added dividedly in a necessary amount. It may be made present in a reaction vessel prior to the addition of aqueous-soluble silver salt and/or aqueous-soluble halide, or it may be added to an aqueous halide solution to be added. It may be added apart from the aqueous-soluble silver salt and halide.

In the invention, an oxidizing agent may be used for the silver halide emulsion. The following oxidizing agents can be used:

Hydrogen peroxide and its adduct (e.g., $NaBO_2$—$H_2O_2$-$3H_2O$, $2NaCO_3$-$3H_2O_2$, $Na_4P_2O_7$-$2H_2O_2$, $2Na_2SO_4$—$H_2O_2$—$H_2O$), peroxy acid salt (e.g., $K_2S_2O_8$, $k_2C_2O_6$, $K_4P_2O_8$), $K_2[Ti(O_2)C_2O_4]3H_2O$.

In addition, peracetic acid, ozone, iodine, bromine and thiosulfonic acid type compound are also usable.

The addition amount of the oxidizing agent depends on kind of a reducing agent, conditions for forming silver nuclei, addition time and conditions of the oxidizing agent, and is preferably $10^{-2}$ to $10^{-5}$ mol per mol of silver halide.

The oxidizing agent may be added at any step during the course of preparing silver halide emulsion The oxidizing agent may be added prior to addition of the reducing agent. After adding the oxidizing agent, a reducing agent may newly added to deactivate a oxidizing agent in excess. The reducing agent, which is capable of oxidizing the above oxidizing agent, includes sulfinic acids, di- or tri-hydroxybenzenes, chromanes, hydrazines or hydrazides, p-phenylenediamines, aldehydes, aminophenols, ene-diols, oximes, reducing sugars, phenidones, sulfites and ascorbic acid derivatives. The reducing agent is added in an amount of $10^{-3}$ to $10^3$ mol per mol of silver halide.

Heavy metal ions usable in the invention are preferably Group VIII metal elements of the periodic table, such as iron, iridium, platinum, paradium, nickel, rhodium, osmium, ruthenium and cobalt; Group II metal elements, such as cadmium, zinc and mercury; lead, molybdenum, tungsten, chromium. Among these, transition metal ions, such as iron, iridium, platinum, ruthenium and osmium are preferred.

The heavy metal ion may be to a silver halide emulsion in the form of a salt or a complex salt. In particular, addition in the form of a complex salt is preferred, since it is easily incorporated in the grain, resulting in larger effects.

In cases where the heavy metal ion forms a complex, examples of ligands include a cyanide, thiocyanate, isothiocyanate, cyanate, chloride, bromide, iodide, carbonyl, and ammonia. Among these, thiocyanate, isothiocyanate and cyanate are preferred.

Heavy metal compounds usable in the invention are shown as below, but not limited to these compounds. (1) $FeCl_2$, (2) $FeCl_3$, (3) $(NH_4)Fe(SO_4)_2$, (4) $K_3[Fe(CN)_6]$, (5) $K_4[Fe(CN)_6]$, (6) $K_2[IrCl_6]$, (7) $K_3[IrCl_6]$, (8) $K_2[PtCl_6]$, (9) $K_2[Pt(SCN)_4]$, (10) $K_2[PdCl_6]$, (11) $K_2[PdCl_6]$, (12) $K_3[PdCl_6]$, (13) $CdCl_2$, (14) $ZnCl_2$, (15) $K_2[Mo(CO)_4(CN0)_2]$, (16) $K_3[Re(CNO)_6]$, (17) $K_3[Mo(CNO)_6]$, $K_4[Fe(CN0)_6]$, (19) $K_2[W(CO)_4(CNO)_2]$, (20) $K_2[Cr(CO)_4(CNO)_2]$, (21) $K_4[Ru(CNO)_6]$, (22) $K_2[Ni(CN)_4]$, (23) $PbCl2$, (24) $K_3[Co(NH_3)_6]$, (25) $K_5[Co(CNO)_{11}]$, (26) $K_3[Re(CNO)_6]$, (27) $K_4[Os(CNO)_6]$, (28) $K_2[Cd(CNO)_4]$, (29) $K_2[Pt(CNO)_4]$, (30) $K_3[IrBr_6]$ The heavy metal ion may be contained in silver halide emulsion grains by adding a heavy metal compound at a time before, during, or after forming silver halide grains and during physical ripening. For example, the heavy metal compound is added, in the form of a aqueous solution, at a desired timing. It may be contained in silver halide, and the resulting silver halide is continuously added over a period of forming silver halide grains. The heavy metal is added in an amount of $1\times10^{-9}$ to $1\times10^{-2}$ and preferably, $1\times10_{-8}$ to $1\times10_{-3}$ mol per mol of silver halide.

Gelatin is preferably employed as a dispersing medium used for protective colloid of silver halide grains. Usable gelatins include alkali-processed gelatin, acid-processed gelatin, low molecular weight gelatin (molecular weight of 20,000 to 100,000), modified gelatin such as phthalated gelatin. In addition, hydrophilic colloid is also usable, as concretely described in Research Disclosure (hereinafter, denoted as RD) Vol. 176, 17643 (December, 1978).

Silver halide emulsions may be subjected to desalting to remove unnecessary soluble salts or may be left contained. Desalting can be carried out according to methods described in RD Vol.176, 17643, II.

The average gain size of the tabular silver halide grains according to the invention is preferably 0.15 to 5.0 $\mu m$, more preferably 0.4 to 3.0 $\mu m$ and furthermore preferably 0.4 to 2.0 $\mu m$. The average grain thickness of the tabular silver halide grains is preferably 0.01 to 1.0 $\mu m$, more preferably 0.02 to 0.40 $\mu m$ and furthermore preferably 0.02 to 0.30 $\mu m$. The grain size and thickness can be optimized so as to make excellent photographic characteristics such as sensitivity. The optimal grain size and thickness are variable, depending on factors affecting on photographic characteristics such as sensitivity (e.g., thickness of hydrophilic colloidal layer, degree of hardening, conditions for chemical ripening, and objective sensitivity and silver coverage of the photographic material.

The spectral sensitizing dye represented by formula (1) or (2) will be explained as below. Thus, in formula (1) and (2), a lower alkyl groups represented by R, $R_1$, $R_2$, and $R_{11}$ through $R_{14}$ are those having carbon atoms of 1 to 6. Examples thereof include unsubstituted lower alkyl groups such as methyl, ethyl, propyl, isopropyl, butyl, cyclopentyl and cyclohexyl, and substituted lower alkyl groups such as hydroxyethyl, ethoxycarbonylethyl, ethoxycarbonylmethyl, benzyl, phenethyl, methoxyethylcyanomethyl, 2-cyanoethyl, 2,2,2-trifluoroethyl, 2,2,3,3-tetrafluoropropyl, carboxymethyl, carboxyethyl, sulfobutyl, sulfoethyl, sulfopropyl, sulfopentyl, 6-sulfo-3-oxahexyl, 4-sulfo-3-oxapentyl, 10-sulfo-3,6-dioxadecyl, 6-sulfo-3-thiahexyl, o-sulfobenzyl, p-sulfobenzyl, p-carboxybenzyl, methanesulfonylaminoethyl, methanesulfonylaminocarbonylmethyl, 3-oxobutyl, 2-(N-methylsulfamoyl)ethyl and 2-(trifluoroacetylamino)ethyl.

At least one of $R_1$ and $R_2$, and at lest one of $R_{12}$ and $R_{14}$ are each a lower alkyl group substituted by a hydrophilic group. The hydrophilic group is preferably a sulfo group or carboxy group.

Examples of an alkenyl group represented by $R_{11}$, and $R_{13}$ include a vinyl group, allyl group, and 1-propenyl group.

$Z_1$ and $Z_2$ each represent a hydrogen atom or substituent. Examples of the substituent include a halogen atom (e.g., fluorine atom, chlorine atom, bromine atom, iodine atom), aryl group (e.g., phenyl, 4-bromophenyl), alkyl group (e.g., methyl, ethyl, t-butyl), alkoxy group (e.g., methoxy, ethoxy), alkylthio group (e.g., methylthio, propylthio), trifluoromethyl group, cyano group, carboxy group, alkoxycarbonyl group (e.g., methoxycarbonyl, ethoxycarbonyl), acyl group (e.g., acetyl, propionyl), sulfonyl group (e.g., methanesulfonyl, trifluoromethanesulfonyl), carbamoyl group (v carbamoyl, N,N-dimethylcarbamoyl, N-morpholinocarbonyl), sulfamoyl group (e.g., sulfamoyl, N,N-dimethylsulfamoyl), acetylamino group, and acetyloxy group.

At least one of $Z_1$ and $Z_2$ is an electron attractive group. Of the above-described substituent, examples of the electron attractive group include a halogen atom, aryl group, trifluoromethyl group, cyano group, carboxy group, sulfonyl group, carbamoyl group and sulfamoyl group. In other words, the electron attractive group is referred to as a group having a positive value with respect to Hammett's $\sigma_p$ value. It is preferred that the sum of Hammett's $\sigma_p$ value of $Z_1$ and $Z_2$ is not more than 2.4.

The Hammett's $\sigma_p$ value is referred to as a substitution constant obtained, by Hammett et al., from electromeric effect of a substituent on hydrolysis of ethyl benzoate, as described in detail in Journal of Organic Chemistry vol.23, pages 420–427 (1958); Jikken Kagaku Kohza (Series of Experimental Chemistry) vol. 14 (published by Maruzen); Hammett, "Physical Organic Chemistry" (published by McGraw-Hill Book Co., 1940); Drug Design VII (published by Academic Press, New York, 1976) and "Yakubutsu no Kohzo-kassei-sohkan" (Structure-Activity Correlations of Chemicals, published by Nankohdo, 1979).

$Z_3$, $Z_4$ or $Z_5$ each represent a hydrogen atom or a substituent. The substituent represented by $Z_3$, $Z_4$ or $Z_5$ is optional. Preferred examples thereof include a halogen atom (e.g., fluorine atom, chlorine atom, bromine atom, iodine atom), aryl group (e.g., phenyl, 4-bromophenyl), alkyl group (e.g., methyl, ethyl, t-butyl), alkoxy group (e.g., methoxy, ethoxy), alkylthio group (e.g., methylthio, propylthio), trifluoromethyl group, cyano group, carboxy group, alkoxycarbonyl group (e.g., methoxycarbonyl, ethoxycarbonyl), acyl group (e.g., acetyl, propionyl), sulfonyl group (e.g., methanesulfonyl, trifluoromethanesulfonyl), carbamoyl group (v carbamoyl, N,N-dimethylcarbamoyl, N-morpholinocarbonyl), sulfamoyl group (e.g., sulfamoyl, N,N-dimethylsulfamoyl), and hydroxy group.

A condensed ring formed by combining $Z_3$ with $Z_4$, or $Z_4$ with $Z_5$ includes a 6-membered saturated or unsaturated carbon ring, and 5 or 6-membered heterocyclic ring. Besides an azole ring, for example, [2,1-d]azole, naphtho[1,2-d]azole, furano[3,2-e]benzoazole, thieno[3,2-e]benzoazole and thieno[2,3-f]benzoazole are also formed.

$Z_{11}$, $Z_{12}$, $Z_{13}$ and $Z_{14}$, which may be the same or different from each other, each represents a halogen atom (e.g., fluorine atom, chlorine atom, bromine atom, iodine atom), cyano group, alkyl group (e.g., methyl, ethyl, t-butyl), alkoxy group (e.g., methoxy, ethoxy), halogen-substituted alkoxy group (e.g., trifluoromethoxy, tetrafluoroethyloxy)m aryloxy group (e.g., phenyloxy, 4-bromophenyloxy), acyloxy (e.g., acetyloxy, propionyloxy), alkylthio group (e.g., methylthio, propylthio), halogen-substituted alkylthio group (e.g., trifluoromethylthio, tetrafluoroethylthio), alkoxycarbonyl group (e.g., methoxycarbonyl, ethoxycarbonyl), carbamoyl group (v carbamoyl, N,N-dimethylcarbamoyl, N-morpholinocarbonyl), sulfamoyl group (e.g., sulfamoyl, N,N-dimethylsulfamoyl), hydroxy group, haloalkyl group (e.g., trifluoromethyl, pentafluoroethyl), carboxy group, sulfonyl group (e.g., methanesulfonyl, trifluoromethanesulfonyl), acylamino group (e.g., acetylamino, butylylamino), heterocyclic group) e.g., furanyl, pyrrolyl) and aryl group (e.g., phenyl, 4-chlorophenyl).

Examples of the ion represented by $X_1$ or $X_{11}$ include chloride ion, bromide ion, iodide ion, thiocyanate ion, sulfate ion, perchlorate ion, p-toluensulfonate ion, ethylsulfate ion, lithium ion, sodium ion, potassium ion, magnesium ion, and triethylammonium ion. n1 and n11 each are an integer of 0 to 6 and preferably 0 or 1.

Examples of a spectral sensitizing dye represented by formula (1) and benzimidazolocarbocyanine sensitizing dye represented by formula (2) are shown below, but the present invention is not limited thereto.

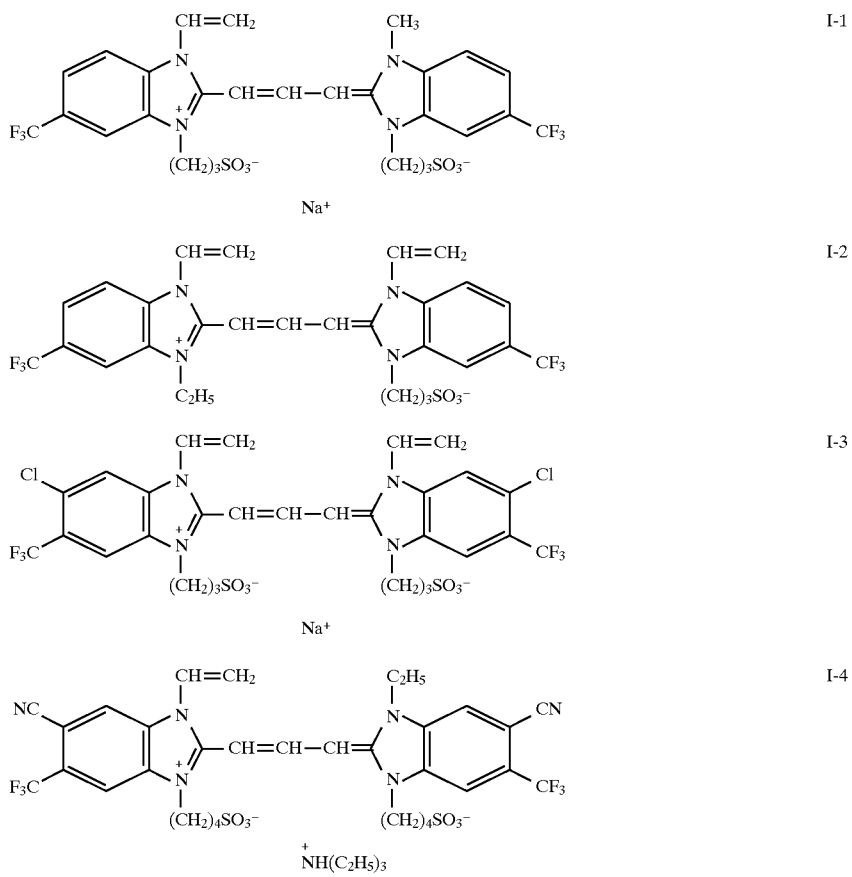

-continued
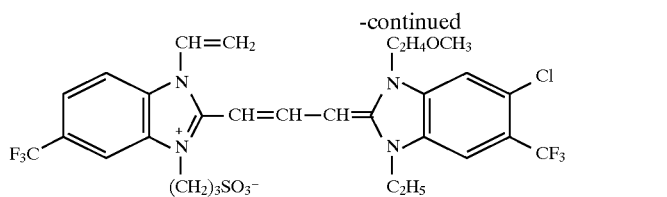 I-5
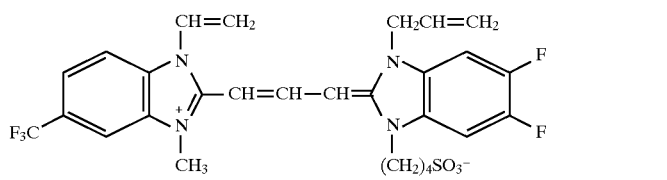 I-6
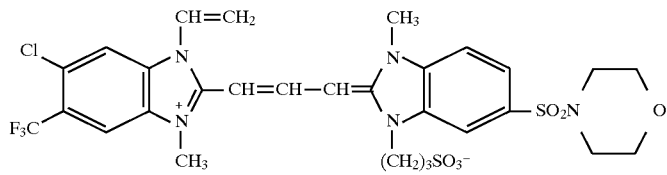 I-7
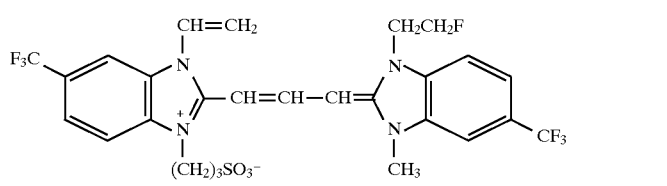 I-8
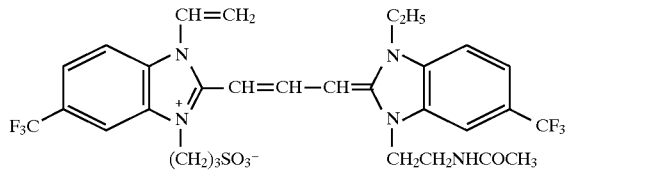 I-9
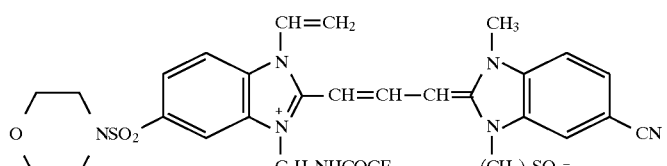 I-10
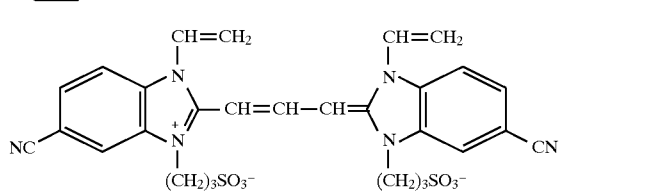 I-11
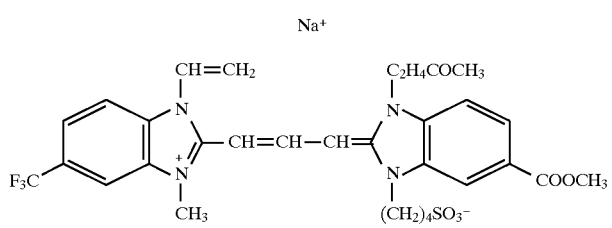 I-12
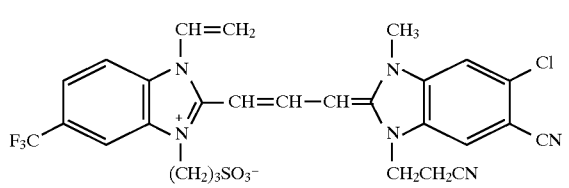 I-13

-continued
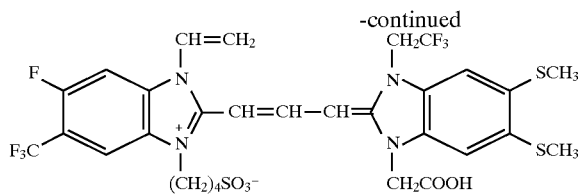 I-14
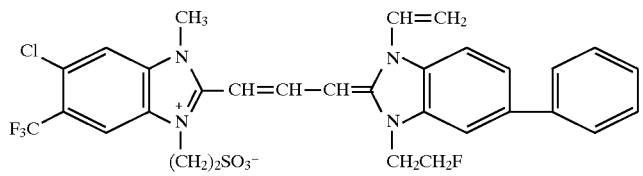 I-15
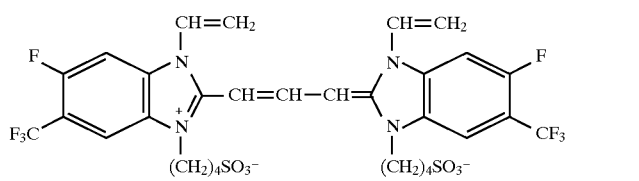 I-16
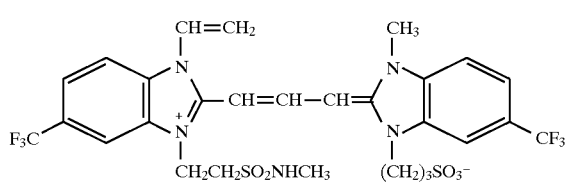 I-17
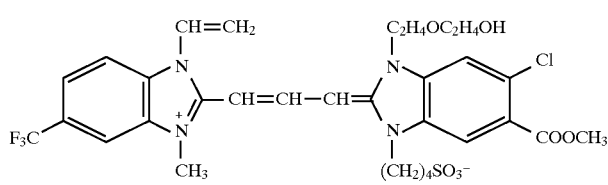 I-18
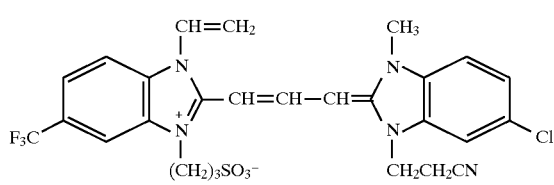 I-19
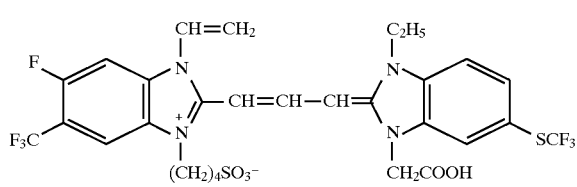 I-20
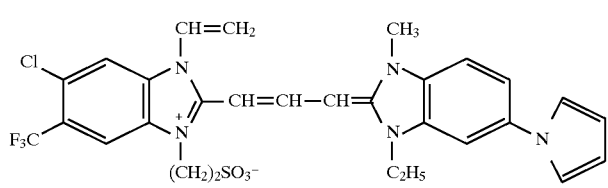 I-21
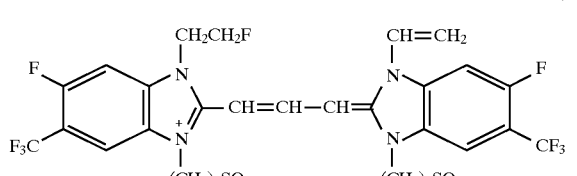 I-22

-continued
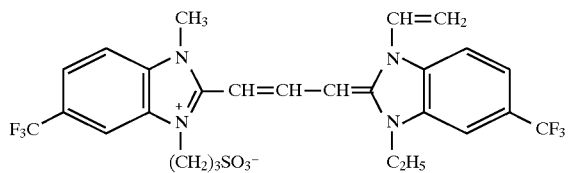
I-23
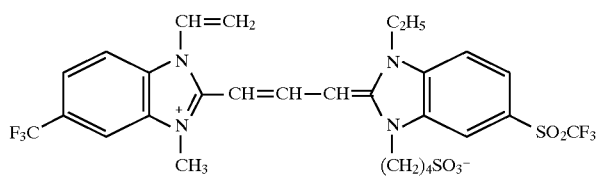
I-24
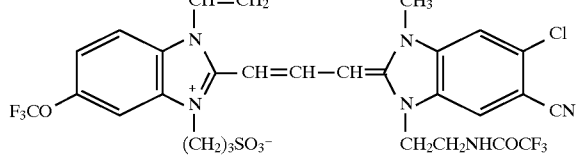
I-25
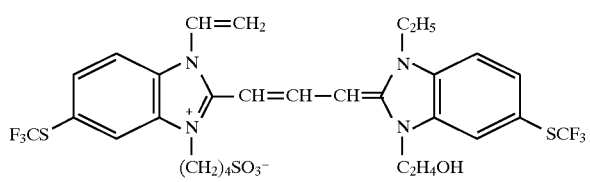
I-26
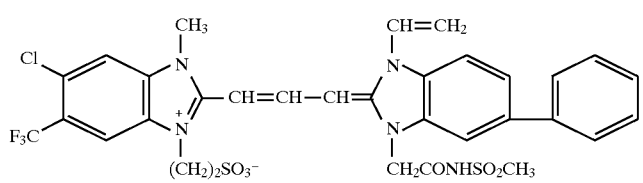
I-27
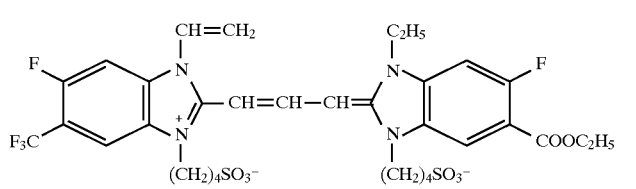
I-28
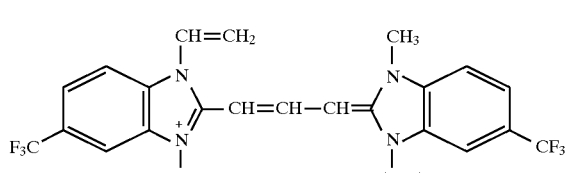
I-29
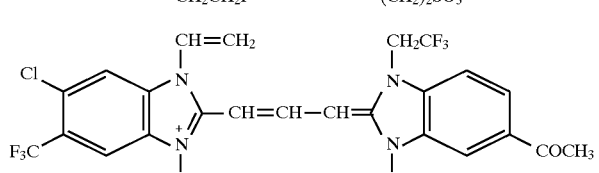
I-30
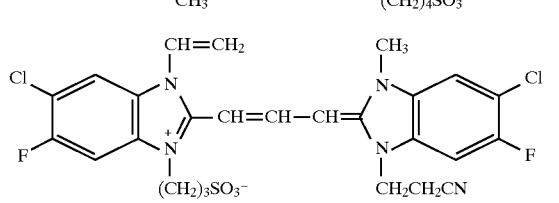
I-31

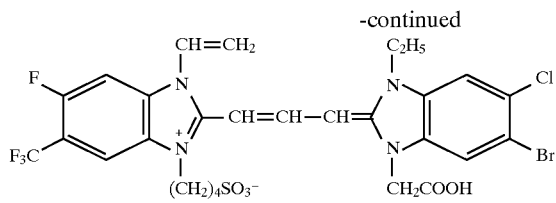
I-32
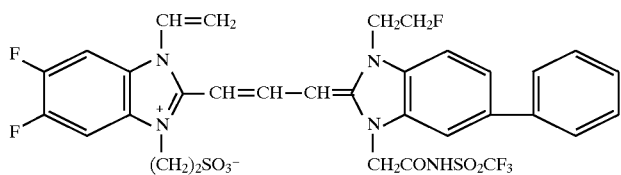
I-33
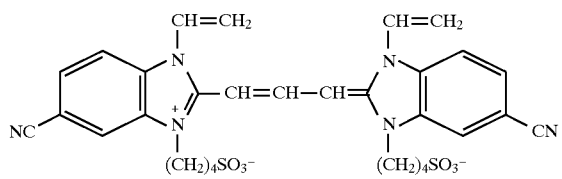
I-34
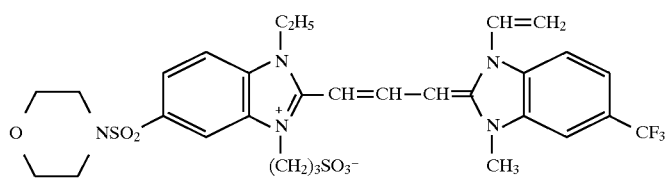
I-35
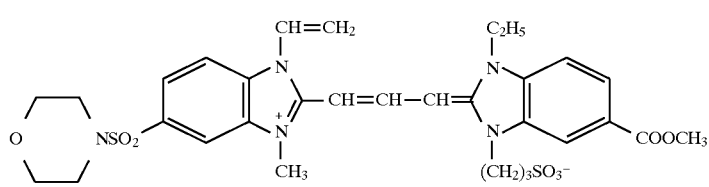
I-36
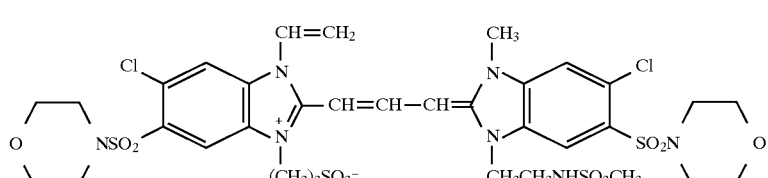
I-37
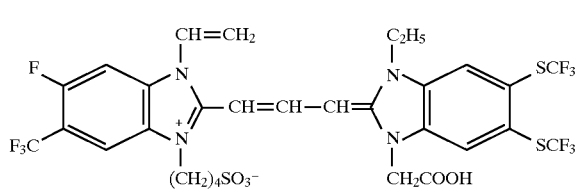
I-38
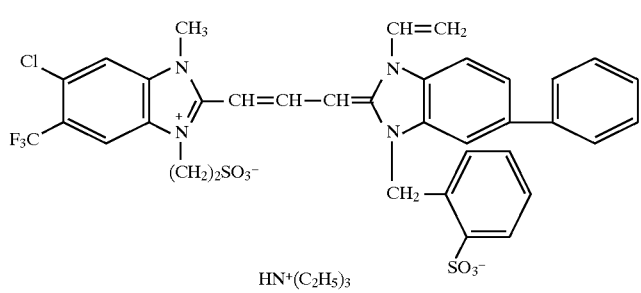
I-39

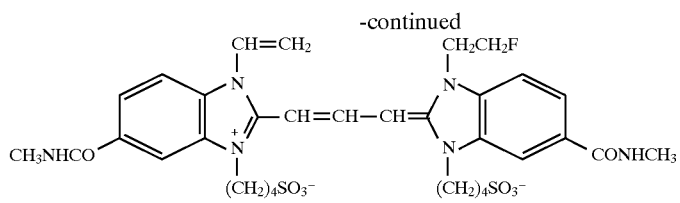
I-40
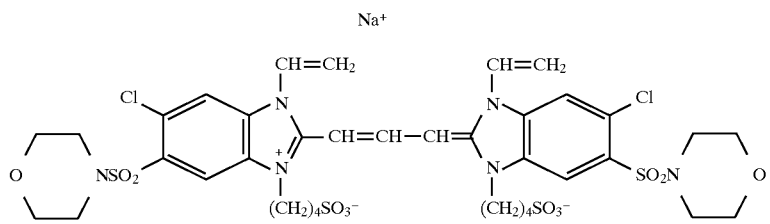
I-41
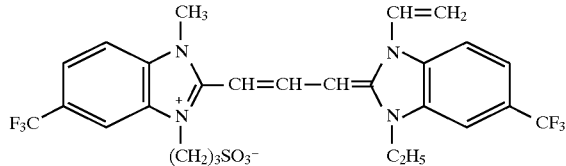
I-42
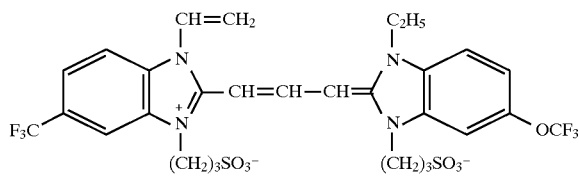
I-43
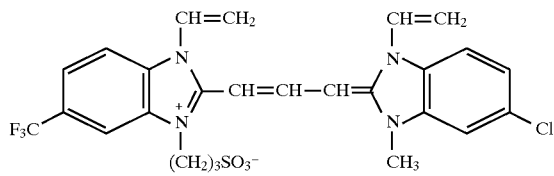
I-44
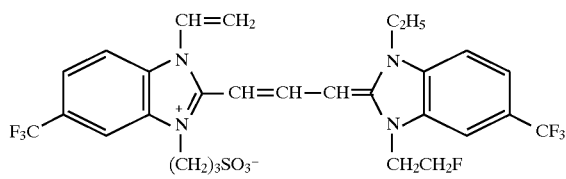
I-45
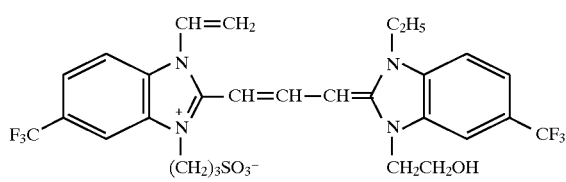
I-46
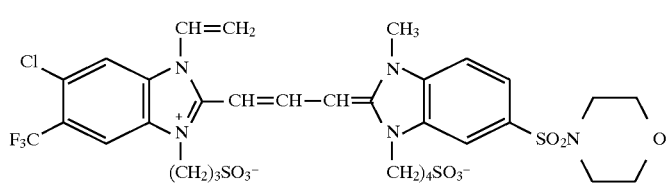
I-47

-continued
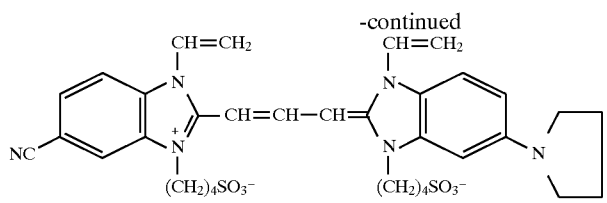
I-48
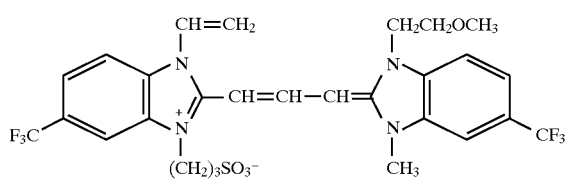
I-49
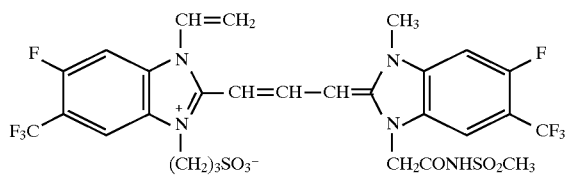
I-50
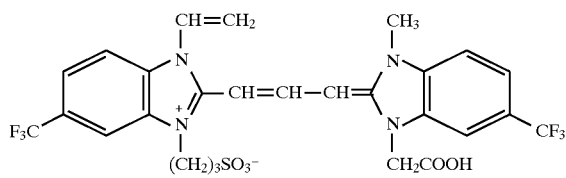
I-51
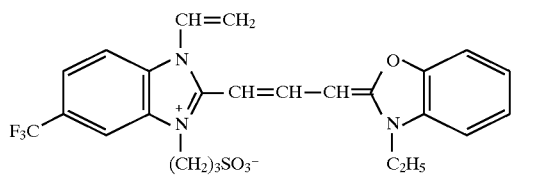
I-52
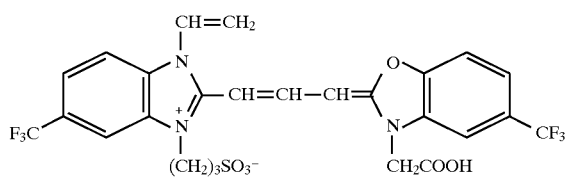
I-53
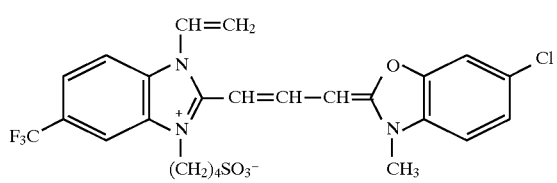
I-54
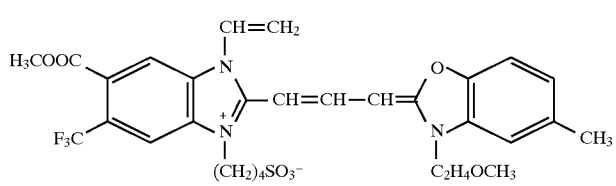
I-55
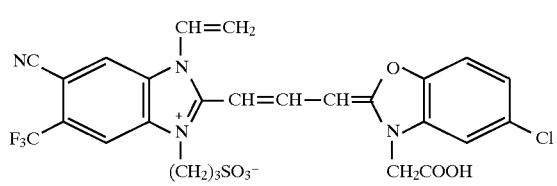
I-56

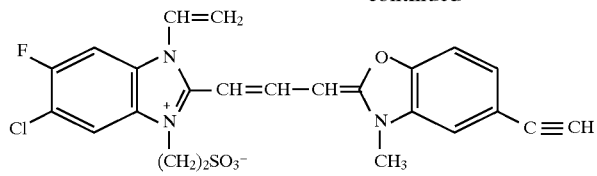
I-57
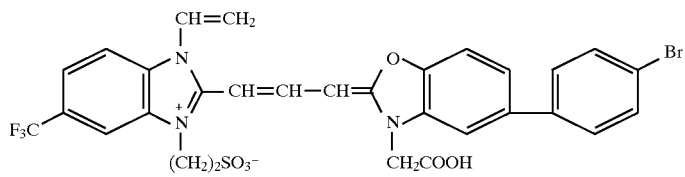
I-58
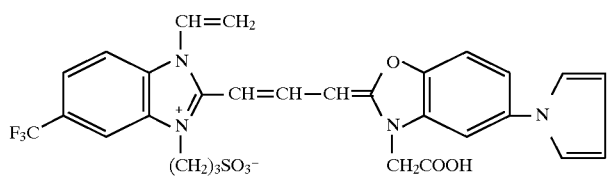
I-59
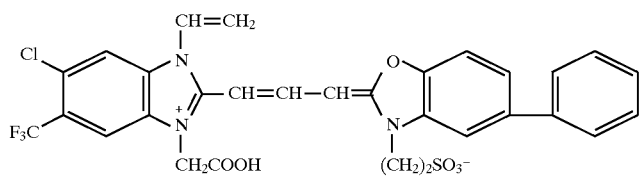
I-60
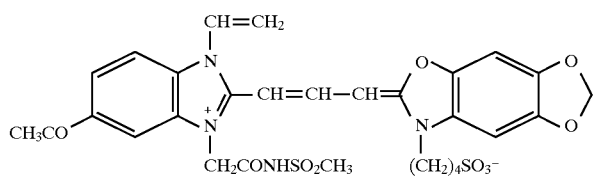
I-61
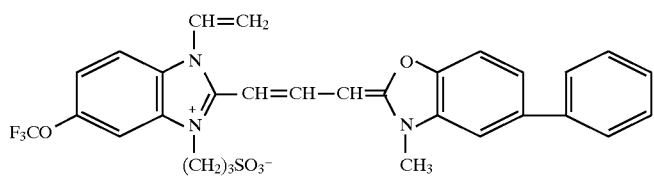
I-62
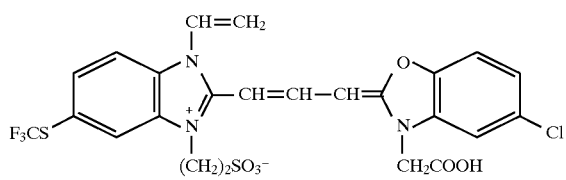
I-63
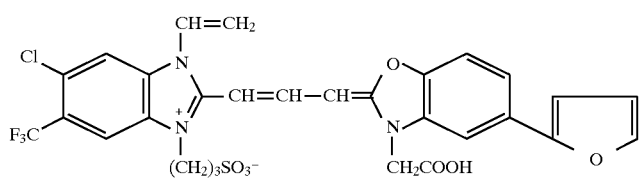
I-64
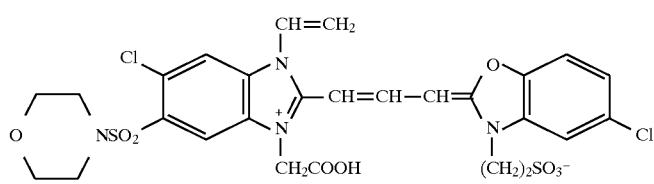
I-65

-continued

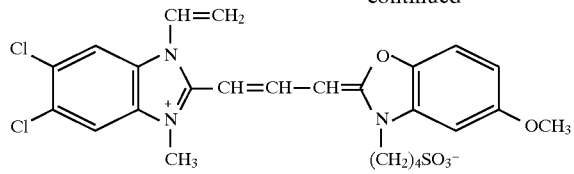
I-66

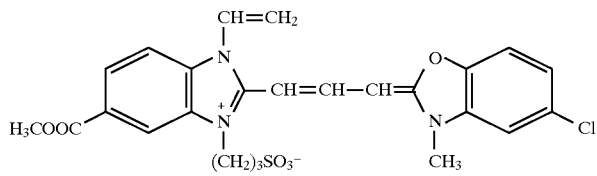
I-67

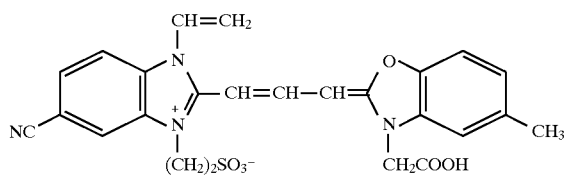
I-68

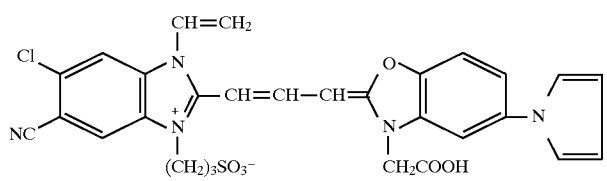
I-69

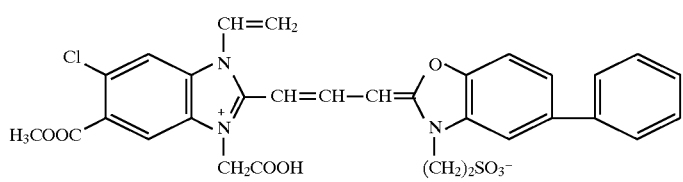
I-70

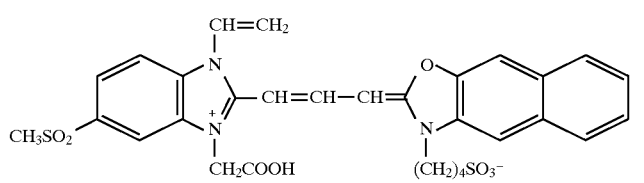
I-71

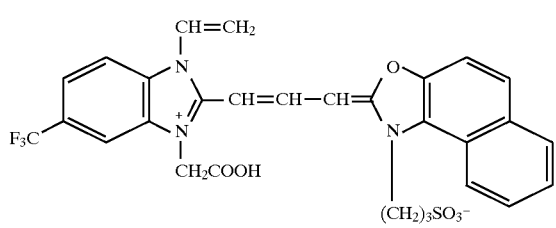
I-72

The adding amount of the spectral sensitizing dye according to the invention variable, depending on the kind of the dye, and structure, composition, ripening conditions, objectives and uses of silver halide. The sensitizing dye is preferably added in the form of a solid fine particle dispersion or acidic solution. The silver coverage on one side of the support is preferably 0.1 to 1.6 g/m$^2$ for achieving the objectives of the present invention. The coating amount of gelatin is preferably 0.1 to 2.2 g/m$^2$ and a ratio by weight of a sensitizing dye to silver is preferably 0.0001 to 0.004.

In the invention, the spectral-sensitizing dye is adsorbed to silver halide grains and contribute to spectral sensitization. In one embodiments of the present invention, the spectral sensitizing dye is applied to X-ray photographic materials for medical use which is employed in combination with a green light-emitting phosphor. When the dye is allowed to adsorbed to silver halide emulsion grains and reflection absorption spectrum thereof is measured, it is preferred that a J-band is formed in the same wavelength region as the green light emitted from the phosphor. Thus, it is necessary to select a spectral sensitizing dye so as to form the J-band having an absorption maximum within a range of 530 to 560 nm, preferably 535 to 555 nm and more preferably, 540 to 550 nm.

The use of a combination of two or more sensitizing dyes according to the invention is useful in photographic materials which need sensitivity to green light.

The photographic material according to the invention contains a spectral sensitizing dye represented by formula (1) or a benzimidazolocarbocyanine dye represented by formula (2). If the absorption maximum of the photographic material according to the invention is in the range of 530 to 560 nm, the sensitizing dye represented by formula (1) or (2) can be used singly or in combination thereof, or in combination with other kind of a dye, such as cyanine, merocyanine or holopolar cyanine.

Along with the spectral sensitizing dye, a dye substantially having no spectral sensitizing capability or a substance substantially not absorbing visible light, each of which exhibits supersensitizing action may be incorporated to an emulsion layer.

The adding amount of the spectral sensitizing dye, depending on the kind of the dye, and structure, composition, ripening conditions, objectives and uses of silver halide, is preferably in such an amount as to be less than 75% of monomolecular layer coverage, more preferably, less than 65%. The monomolecular layer coverage refers to a relative value, based on that, when absorption isotherm at 50° C. is prepared, a saturated absorbing amount is 100% of the coverage. The optimal amount of the spectral sensitizing dye, which is variable, depending on the total surface area of silver halide grains contained in an emulsion, is less than 500 mg and preferably less than 400 mg per mol of silver halide.

The silver coverage on one side of the support is preferably not more than 1.6 g/m$^2$. The coating amount of gelatin is preferably not more than 2.2 g/m$^2$ and a ratio by weight of a sensitizing dye to silver coating amount is preferably 0.0001 to 0.004, preferably not more than 0.0035 and more preferably, not more than 0.0030.

In the invention, development initiation points can be formed in the corner or in the vicinity thereof by covering the surface of silver halide grains with a compound capable of being adsorbed to silver halide, such as spectral sensitizing dye or stabilizer to control chemical-sensitizing nucleus-forming sites and/or by using a chemical sensitizer which is selective toward a reaction site.

As a solvent for the sensitizing dye are usable conventionally employed water-miscible organic solvents, including alcohols, ketones, nitrites, and alkoxyalcohols. Examples thereof include methanol, ethanol, n-propyl alcohol, isopropyl alcohol, ethylene glycol, propylene glycol, 1,3-propanediol, acetone, acetonitrile, 2-methoxyethanol and 2-ethoxyethanol.

According to the invention, advantageous effects are enhanced by adding the sensitizing dye in the form of an acidic solution or a solid fine particle dispersion rather than in the form of an organic solvent solution. At least one sensitizing dye is preferably added in the form of scarcely water-soluble, solid fine particles dispersed in water substantially free from an organic solvent and/or surfactant. The expression, "water substantially free from an organic solvent and/or surfactant" refers to water containing impurities less than an extent of not exerting an unfavorable influence upon a silver halide emulsion. It is preferably deionized water or distilled water.

The spectral sensitizing dye can be added during the process of chemical ripening, in particular, at the time when starting the chemical ripening. Alternatively, a high sensitive silver halide emulsion superior in spectral-sensitizing efficiency can be obtained by adding the dye at the time during the course of from the nucleation process of a silver halide emulsion to completion of its desalting process. The dye added in the afore-mentioned process (from nucleation process to completion of desalting process) or another kind of a sensitizing dye can be added at any time of from completion of the desalting process, through the chemical ripening process, to the time immediately before coating.

Conditions for chemical ripening, i.e., chemical sensitizing process, such as pH, pAg, temperature, and time are not specifically limitative. Chemical ripening can be conducted according to conditions used in the art. Chemical sensitization is conducted by employing sulfur sensitization with a compound containing sulfur capable of reacting with a silver ion or active gelatin, selenium sensitization with selenium compounds, tellurium sensitization with tellurium, reduction sensitization with reducing compounds and noble metal sensitization with noble metals such as gold, singly or in combination thereof. Of these, selenium sensitization, tellurium sensitization and reduction sensitization are preferably employed. Specifically, sulfur sensitization, gold sensitization and selenium sensitization are preferred. A chemical sensitizing method used for chemical sensitization is referred to a sensitizing method described in Japanese Patent Application No. 5-261264.

Selenium sensitizers usable in the selenium sensitization include a variety of selenium compounds. Examples thereof include colloidal selenium metal, isoselenocyanates (e.g., allylisoselenocyanate), selenoureas (e.g., N,N-dimethylselenourea, N,N,N'-triethylselenourea, N,N,N'-trimethyl-N'-heptafluoroselenourea, N,N,N'-trimethyl-N'-heptafluoropropylcarbonylselenourea, N,N,N'-trimethyl-N'-4-nitrophenylcarbonylselenourea), selenoketones (e.g., selenoacetone, selenoacetophenone), selenoamides (e.g., selenoacetoamide, N,N-dimethylselenobenzamide), selenocarboxylic acids and selenoesters (e.g., 2-selenopropionic acid, methyl-3-selenobutylate), selenophosphates (tri-p-triselenophosphate), and selenides (e.g., triphenylphosphineselenide, diethylselenide, diethyldiselenide). Of these sensitizers, selenoureas, selenoamides and selenoketones are preferred. In the invention, the selenium sensitizer is added preferably in the form of a solid fine particle dispersion, rather than in the form of an organic solvent solution.

The gold sensitizer includes, in addition to chloroauric acid, gold thiosulfate and gold thiocyanate, various kinds of gold complexes of a variety of compounds such as thioureas and rhodanines. A using amount of the sulfur sensitizer or gold sensitizer, depending on the composition of silver halide, the kind of a compound to be used and ripening conditions, is preferably $1 \times 10^{-4}$ to $1 \times 10^{-9}$ mol and more preferably $1 \times 10^{-5}$ to $1 \times 10^{-8}$ mol per mol of silver halide.

The compound represented by formula (3) will be described as below. In the formula, an aliphatic group represented by $R_{21}$ and $R_{22}$ includes a straight-chained or branched alkyl group, alkenyl group, alkynyl group and cycloalkyl group, each having 1 to 30, preferably, 1 to 20 carbon atoms. Examples thereof include methyl, ethyl, t-butyl, propyl, butyl, hexyl, decyl, dodecyl, isopropyl, t-butyl, 2-ethylhexyl, allyl, 2-butenyl, 7-octenyl, propargyl, 2-butynyl, cyclopropyl, cyclopentyl, cyclohexyl, and cyclododecyl. An aromatic group represented by $R_{21}$ and $R_{22}$ includes one having 6 to 20 carbon atoms, such as phenyl, naphthyl and anthranyl. A heterocyclic group represented by $R_{21}$ and $R_{22}$ may be a monocyclic ring or condensed ring, including 5 or 6-membered heterocyclic ring containing at least one of O, S and N atoms. Examples thereof include pyrrolidine, piperidine, tetrahydrofuran, oxirane, morpholine, thiomorpholine, thiopyran, tetrahydrothiophene, pyrrole, pyridine, furan, thiophene, imidazole, pyrazole, oxazole, thiazole, isooxazole, isothiazole, triazole, tetrazole, thiadiazole, oxadiazole and groups derived from benzelogs of these groups. A ring formed by combination of $R_{21}$ with $R_{22}$ includes 4 to 7-membered rings, and of these, 5 to 7-membered rings are preferred. The group represented by r₂₁ and R₂₂ is preferably the heterocyclic group and more preferably an aromatic heterocyclic group. The aliphatic group, aromatic group and heterocyclic group represented by R₂₁ and R₂₂ may be substituted. Examples of substituents include a halogen atom (e.g., chlorine atom, bromine atom), alkyl group (e.g., methyl, ethyl, isopropyl, hydroxyethyl, methoxymethyl, trifluoromethyl, t-butyl), cycloalkyl group (e.g., cyclopentyl, cyclohexyl), aralkyl (e.g., benzyl, 2-phenethyl), aryl group (e.g., phenyl, naphthyl, p-tolyl, p-chlorophenyl), alkoxy group (e.g., methoxy, ethoxy, isopropoxybutoxy), aryloxy group (e.g., pheoxy, 4-methoxyphenoxy), cyano group, acylamino group (e.g., acetylamino, propionylamino), alkylthio group (e.g., methylthio ethylthio, butylthio), arylthio group (e.g., phenylthio, p-methylphenylthio), sulfonylamino group (e.g., methanesulfonylamino, benzenesulfonylamino), ureido group √3-methylureido, 3,3-dimethylureido, 1,3-dimethylureido), sulfamoylamino group (e.g., dimethylsufamoylamino, diethylsulfamoylamino), carbamoyl group (e.g., methylcarbamoyl, ethylcarbamoyl, dimethylcarbamoyl), sulfamoyl group (e.g., ethylsufamoyl, dimethylsulfamoyl), alkoxycarbonyl group (e.g., methoxycarbonyl, ethoxycarbonyl), aryoxycarbonyl (e.g., phenoxycarbonyl, p-chloropheoxycarbonyl), sulfonyl group (e.g., methanesulfonyl, butanesulfonyl, phenylsufonyl), acyl group (e.g., acetyl, propanoyl, butyloyl)amino group (e.g., methylamino, ethylamino, dimethylamino), hydroxy group, nitro group, nitroso group, amineoxide group (e.g., pyridine-oxide), imido group (e.g., phthalimido), disulfide group (e.g., benzenesulfide, benzthiazolyl-2-disulfide), and heterocyclic group (e.g., pyridyl, benzimidazolyl, benzthiazolyl, benzoxazolyl). R₂₁ and R₂₂ can have single or plural substituents selected from the above groups. The above substituents each may be further substituted. m is an integer of 2 to 6, preferably, 2 to 3.

Examples of the compound represented by formula (3) are shown as below, but the present invention is not limited thereto.

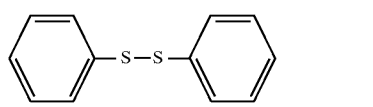 3-1

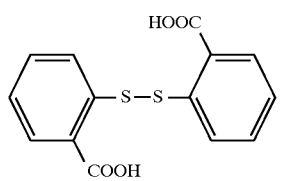 3-2

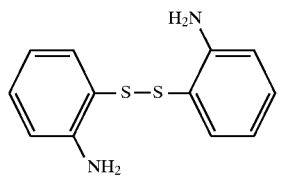 3-3

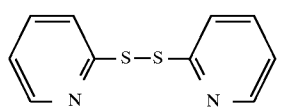 3-4

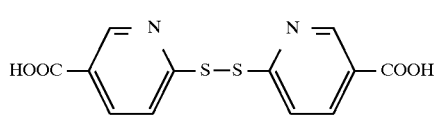 3-5

-continued

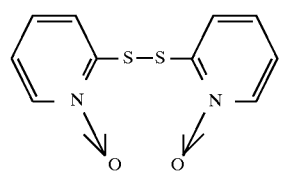 3-6

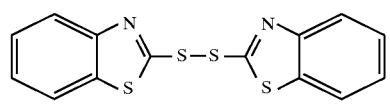 3-7

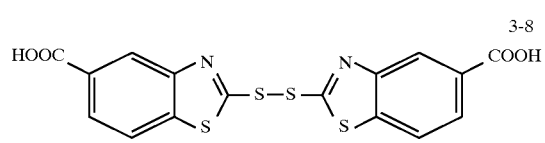 3-8

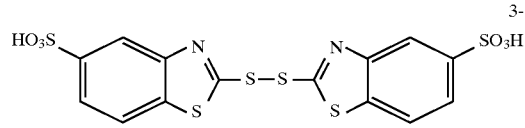 3-9

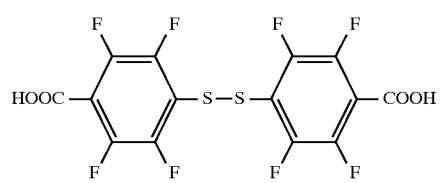 3-10

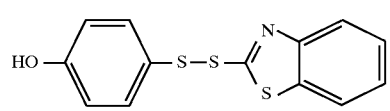 3-11

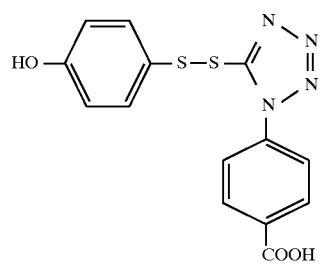 3-12

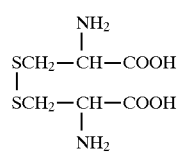 3-13

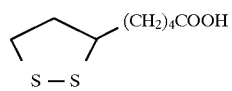 3-14

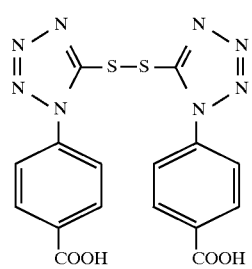 3-15

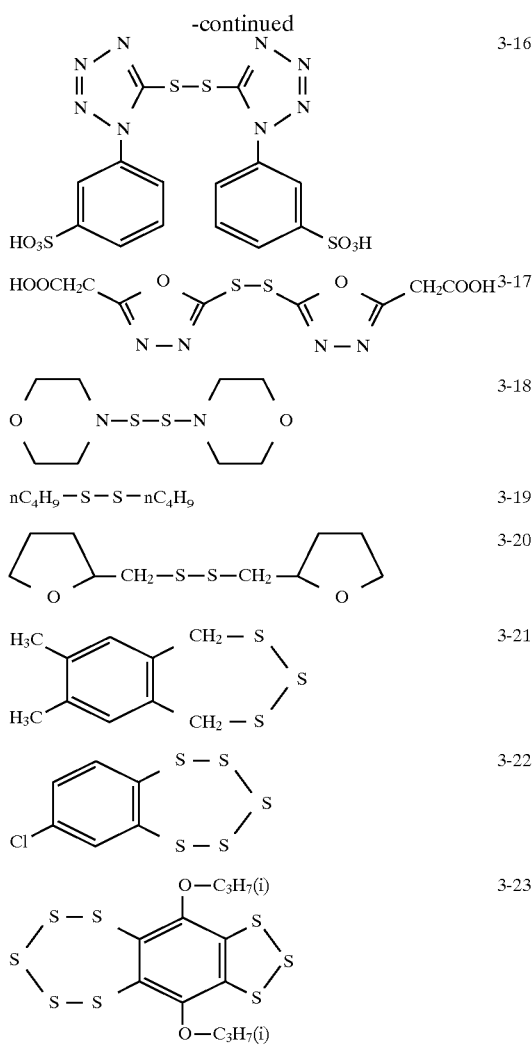

Incorporation of the compound represented by formula (3) in the photographic material according to the invention advantageously leads to fog-restraining. The compound is incorporated preferably in an amount of $10^{-7}$ to $10^{-3}$ mol per mol of silver halide.

Incorporation of a dye capable of being decolored and/or leached out during processing in a silver halide emulsion layer or another component layer of the silver halide photographic material according to the invention leads to a photographic material improved in sensitivity and sharpness and with negligible staining due to the dye. Dyes usable in the photographic material can optionally be selected from those which absorb light at desired wavelengths to remove the influence of the wavelengths, leading to improvements in sharpness. It is preferred that the dye be decolored and/or leached out of the photographic material during processing thereof, resulting in no visually noticeable coloration after image formation is completed. Furthermore, incorporation of a dye which exhibits absorption maximum in a range of 580 to 700 nm and is not leached out of the processed material, leads to a photographic material improved in silver color tone and also in residual color.

A variety of adjuvants may be incorporated to the photographic material in accordance with its purpose. The adjuvants are described in Research Disclosure (RD) 17643 (December, 1978), ibid 18716 (November, 1979), and ibid 308119 (Dec., 1989). Kinds of compounds described in these RD and described section are shown below.

TABLE 1

| | RD-17643 | | RD-18716 | RD-308119 | |
|---|---|---|---|---|---|
| Additive | Page | Sec. | Page | Page | Sec. |
| Chemical sensitizer | 23 | III | 648 upper right | 996 | III |
| Sensitizing dye | 23 | IV | 648–649 | 996–8 | IVA |
| Desensitizing dye | 23 | IV | | 998 | IVB |
| Dye | 25–26 | VIII | 649–650 | 1003 | VIII |
| Developing accelerator | 29 | XXI | 648 upper right | | |
| Antifoggant/stabilizer | 24 | IV | 649 upper right | 1006–7 | VI |
| Brightening agent | 24 | V | | 998 | V |
| Hardening agent | 26 | X | 651 left | 1004–5 | X |
| Surfactant | 26–27 | XI | 650 right | 1005–6 | XI |
| Antistatic agent | 27 | XII | 650 right | 1006–7 | XIII |
| Plasticizer | 27 | XII | 650 right | 1006 | XII |
| Slipping agent | 27 | XII | | | |
| Matting agent | 28 | XVI | 650 right | 1008–9 | XVI |
| Binder | 26 | XVII | | 1003–4 | IX |
| Support | 28 | XVII | | 1009 | XVII |

In the photographic material according to the invention, a developing agent such as aminophenol, ascorbic acid, pyrocatechol, hydroquinone, p-phenylenediamine or 3-pyrazolidone can be incorporated in a silver halide emulsion layer or another component layer.

Supports usable in the photographic material of the invention include those described in RD 17643, page 28 and RD 308119, page 1009. A suitable support is plastic films such as polyethylene terephthalate. The surface of the support may be provided with a sublayer or subjected to corona discharge or UV irradiation so as to modify adhesibility. Cross-over cut layers can bee provided on both sides of the support, resulting in improvements in sensitivity and sharpness.

The total amount of gelatin used in silver halide emulsion layer(s), a surface protective layer and other component layer(s) of the photographic material is preferably 1.5 to 2.2 $g/m^2$ of one side of the support. In cases where the amount of gelatin is too much, a dye or sensitizing dye is adsorbed to the gelatin, causing color-stain in the photographic material. The gelatin is preferably used as a dispersing medium for protective colloid of silver halide grains. Examples of the gelatin usable in the invention include alkali-processed gelatin, acid-processed gelatin, low molecular weight gelatin (molecular weight: 20,000 to 100,000) and modified gelatin such as phthalated gelatin. Furthermore, other hydrophilic colloids can be used. Concrete examples thereof are described in RD-17643 (December, 1978).

The silver halide photographic material relating to the invention can be continuously processed with supplying a solid processing composition. The solid processing composition refers to powdered processing composition or solid processing compositions in the form of a tablet, a pellet or granules. The powder is referred to an aggregate comprised of fine crystal particles. The granules is referred to granular material prepared by subjecting the powder to granulating process, having particle sizes of 50 5000 $\mu$m. The tablet is one prepared by subjecting the powder or granules to compression-molding to a given form.

The processing composition can be solidified in such a manner that the processing composition in the form of a concentrated solution, fine powder or granules is mixed with a water soluble bonding agent and then the mixture is molded, or the water soluble bonding agent is sprayed on the surface of temporarily-molded processing composition to form a covering layer, as described in JP-A 4-29136, 4-85533, 4-85534, 4-85535, 4-85536 and 4-172341.

Further, the solid processing composition is preferably in the form of a tablet. A preferred tablet-making process is to form a tablet through granulating powdery processing composition, followed by compression-molding thereof. As compared to a solid composition prepared simply by mixing the processing composition to form a table, solubility and storage stability were advantageously improved, resulting in stable photographic performance. As for granulation process which is carried out prior to tablet-making process, any conventionally known method such as extrusion granulation process, compression granulation process, crush granulation process, fluidized bed granulation process, and spray-dry granulation process can be employed. The average size of the granules is 100 to 800 μm and preferably 200 to 750 μm for preparing the tablet. In particular, 60% or more of the granules is with a deviation of ±100 to 150 μm. When the grain size is smaller, it tends to cause localization of mixing components and therefore, is undesirable. As for compression molding of the resulting granules, any conventional compression molding machine, such as a single-engine compression molding machine, rotary-type compression machine, briquetting machine, etc. may be employed to form a tablet. Compression-molded (compression-tableted) solid processing composition can take any form and is preferably in a cylindrical form (socalled tablet form), in terms of productivity, handleability and problems of powder dust in cases when used in user-side. It is further preferred to granulate separately each component, such as an alkali agent, reducing agent or preservative in the above process.

The solid processing composition in the form of a tablet can be prepared according to methods, as described in JP-A 51-61837, 54-155038, 52-88025, and British Patent 1,213, 808. The granular processing composition can also be prepared according to methods as described in JP-A 2-109042, 2-109043, 3-39735 and 3-39739. The powdery processing composition can be prepared according to methods, as described in JP-A 54-133332, British Patent 725,892 and 729,862 and German Patent 3,733,861.

In cases where the solid processing composition is in the form a tablet, its bulk density is preferably 1.0 to 2.5 $g/cm^3$ in terms of solubility and effects of the invention. When being not less than 1.0 $g/cm^3$, it is advantageous for strength of the solid composition; and when being not more than 2.5 $g/cm^3$, it is advantageous for solubility. In the case of the solid processing composition in the form of granules or powder, its bulk density is preferably 0.40 to 0.95 $g/cm^3$.

The solid processing composition can be used as a developer, fixer or rinsing agent. Particularly when used as a developer, effects of stabilizing photographic performance are marked.

According to the invention, a processing composition having partially a solidified component is also included in the scope thereof. It is, however, preferable that the whole components of these processing chemicals are solidified. It is also preferable that the components thereof are each molded into a separate solid processing composition and then individually packed in the same form. It is further preferable that the components are packed in series in the order of periodically and repeatedly adding them from the packages.

It is preferable that all of the processing composition which is replenished to the corresponding processing tanks so as to meet the information on a processing amount are in the form od solid. When replenishing water is required, it is replenished in accordance with an information on a processing amount or another information on the replenishing water control. In this case, the liquids to be replenished to the processing tank can only be replenishing water. In other words, when being replenished to a plurality of processing tanks, the tank for reserving replenishing liquid can be saved to be only a single tank by making use of replenishing water in common, so that an automatic processor can be made compact in size. A replenishing water tank may be provided outside of the processor or built therein In particular, the built-in type is preferred in terms of saving space.

In cases where a developer is solidified, preferable embodiment of a solid processing composition applicable to the invention is that all of chemicals such as an alkali agent and a reducing agent are solidified to form not more than three compositions, preferably, one composition. When the solid processing chemicals are solidified separately into two or more compositions, it is preferable to pack these compositions, in the form of tablet or granules, in the same package.

As for the means for supplying a solid processing composition to a processing tank, and in the case where the solid processing composition is in the form of a tablet, for example, there are such a well-known means as described in Japanese Utility Model OPI Publication Nos. 63-137783/1988, 63-97522/1988 and 1-85732/1989. Thus, so far as at least a function for supplying the tablet to a processing tank is provided, any means can be applied. And, in the case where the solid processing composition is in the form of granules or powder, there are well-known means, such as a gravity dropping system described in JP-A. 62-81964, 63-84151 and 1-292375, and a screw system described in JP-A 63-105159 and 63-84151. However, the embodiments shall not be limited to the above given well-known means.

Of these, however, a preferable means for supplying a solid processing composition to a processing tank is such a means, for example, that a prescribed amount of a solid processing chemical is weighed out in advance and is then separately packed and the package thereof is opened and the composition is then taken out of the package so as to meet the quantity of light-sensitive materials to be processed. To be more concrete, every prescribed amount of a solid processing composition and, preferably, every amount for a single replenishment is sandwiched between at least two packing materials constituting a package. Separating the package into two directions or opening a part of the package, the solid processing composition can be ready to take out thereof. The solid processing composition ready to be taken out thereof is readily be supplied to a processing tank having a filtration means by naturally dropping the chemical. The prescribed amounts of the solid processing compositions are each separately packed respectively in a tightly sealed package so as to shut off the open air and the air permeability to any adjacent solid processing composition. Therefore, the moisture resistance can be secured unless the packages are opened.

In one embodiment, it may be to have a constitution in which a package comprising at least two packing materials sandwiching a solid processing composition therebetween is brought into close contact with or made adhered to the peripheries of the solid processing composition on each of the contacting surfaces of the two packing materials so as to be separable from each other, if required. When each of the packing materials sandwiching the solid processing composition therebetween is pulled each to the different directions, the close contacted or adhered surfaces are separated from each other, so that the solid processing composition can be ready to take it out.

In another embodiment, it may be to have the following constitution. In a package comprising at least two packing materials sandwiching a solid processing composition therebetween, at least one of the packing materials thereof can be ready to break the seal by applying an external force. The expression, "to break the seal", stated herein means that a packing material is notched or broken off as a part of the packing material remains unnotched or unbroken off. It may be considered to open in such a manner that a solid processing composition is forcibly extruded by applying a compression force from the side of a packing material subject to be unopened through a solid processing composition to the direction of a packing material made ready to be opened, or that a solid processing composition can be ready to take out by notching a packing material subject to be opened by making use of a sharp-edged member.

A supply-starting signal can be obtained by detecting an information on a processing amount. Based on the obtained supply-starting signal, a driving means for separation or breaking the seal is operated. A supply-stopping signal can be obtained by detecting an information on the completion of a prescribed amount of supply. Based on the obtained supply-stopping signal, a driving means for separation or breaking the seal is so controlled as to be stopped in operation.

The above-mentioned solid processing composition supplying means has a means for controlling the addition of a prescribed amount of the solid processing composition in accordance with an information of processing amount of silver halide photographic materials. Thus, in an automatic processor of the invention, these means are required to keep constant the concentration of components in each processing tank so as to stabilize every photographic characteristic. The expression, "an information of the processing amount of silver halide photographic materials", means an information on a value obtained in proportion to an amount of silver halide photographic materials to be processed, to an amount of silver halide photographic materials already processed or to an amount of silver halide photographic materials being processed, and the values indicate directly or indirectly a reduced amount of a processing chemical in a processing solution. The values may be detected at any point of time before or after the photographic material is introduced into a processing solution or during the photographic material is dipped in the processing solution. It may be physical parameters, such as concentrations of components of a processing solution, its variation, or a pH or specific gravity thereof. An amount discharged to the outside after a processing solution is dried up may also be detected.

A solid processing composition used in the invention may be added to any position inside a processing tank and, preferably, to a position communicated with a section for processing a photographic material and circulating a processing solution between the processing tank and the processing section. It is also preferable to have such a structure that a certain amount of processing solution can be circulated therebetween so that a dissolved component can be moved to the processing section. It is further preferable that a solid processing composition is added to a temperature-controlled processing solution.

A developing solution used in the invention preferably contain substantially no dihydroxybenzene type developing agent.

The developing solution used in the invention may contain, as a preservative, an organic reducing agent as well as a sulfite described in JP-A 6-138591. Further, a bisulfite adduct of a hardening agent described in Japanese Patent Application No. 4-586323 is also usable. Compounds described in JP-A 5-289255 and 6-308680 (general formulas 4-a and 4-b) may be contained as an antisludging agent. Addition of a cyclodextrin compound is preferred, particularly as described in JP-A 1-124853.

An amine compound may be added to the developing solution, as described in U.S. Pat. No. 4,269,929. A buffering agent may be used in the developing solution, including sodium carbonate, potassium carbonate, potassium bicarbonate, trisodium phosphate, tripotassium phosphate, dipotassium phosphate, sodium borate, potassium borate, sodium tetraborate, potassium tetraborate, sodium o-hydroxybenzoate (sodium salicylate), potassium o-hydroxybenzoate (potassium salicylate), sodium 5-sulfo-2-hydroxybenzoate (sodium salicylate) and potassium 5-sulfo-2-hydroxybenzoate (potassium salicylate).

Thioether compounds, p-phenylenediamine compounds, quaternary ammonium salts, p-aminophenols, amine compounds, polyalkylene compounds; 1-phenyl-3-pyrazolidones; hydrazines, mesoion type compound and imidazoles may be added as a development accelerating agent. Alkali metal halides such as potassium iodide are used as a antifoggant. Organic antifoggants include benzotriazole, 6-nitrobenzimidazole, 5-nitrobenzimidazole, 5-methylbenzotriazole, 5-nitrobenzotriazole, 5-chlorobenzotriazole, 2-thiazolyl-benzimidazole, 2-thiazolylmethyl-benzimidazole, indazole, hydroxyazaindolizine, adenine and 1-pheny-5-mercaptotetrazole.

Further, methylcellosolve, methanol, acetone, dimethylformamide, cyclodextrin compounds compounds described in Japanese Patent 47-33378 and 44-9509 can be optionally used as an organic solvent for enhancing the solubility of a developing agent. Furthermore, a variety of additives, such as an anti-staining agent, antisludging agent and interlayer effect-promoting agent can be used.

Prior to processing, an addition of a starter is preferred. The starter is added preferably in a solid form. As the starter are employed organic acids such as polycarboxylic acid, alkali-earth metal halide such as KBr, organic restrainer and developing accelerator.

The developing temperature is preferably 25° to 50° C. and more preferably 30° to 40° C. The developing time is preferably 3 to 15 sec. and more preferably 3 to 10 sec. The total processing time (Dry to Dry) is 30 sec. or less and preferably 25 sec. or less. The total processing time is a total processing time including developing, fixing, washing and drying.

Processing chemicals are replenished to make up for exhausted chemicals and exhaustion due to aerial oxidation. Examples of replenishing methods include replenishment based width and transporting speed described in JP-A 55-126243, area replenishment described in 60-104946 and area replenishment on demand in continuously processing described in JP-A 1-149156. The developer-replenishing rate is preferably 14 ml or less and more preferably 7 ml or less per 10×12 inch sheet.

The fixing temperature and time are 20° to 50° C. and 2 to 8 sex., respectively. A fixing solution contains component materials generally employed in the art. The content of iodide is preferably not more than 0.3 g and more preferably not more than 0.1 g/liter. The pH of the fixing solution is not less than 3.8 and more preferably 4.2 to 5.5. The fixer replenishing rate is preferably not more than 14 ml and more preferably not more than 7 ml per 10×12 inch sheet. The fixing solution may be acid fixer with hardener. In this case, aluminum ions are preferably used as a hardener, and, for example, aluminum sulfate, aluminum chloride or potassium alum is added thereto. The fixing solution can optionally contain a preservative such as a sulfite or bisulfite, pH buffer such as acetic acid or boric acid, a pH adjusting agent including various kinds of acids such as mineral acid (e.g., sulfuric acid, nitric acid), organic acid (e.g., citric acid, oxalic acid, malic acid) and hydrochloric acid, and metal hydroxide (e.g., potassium hydroxide, sodium hydroxide), and a chelating agent capable of softening hard water. Exemplary examples of a fixing accelerator include thiourea derivatives described in Japanese Patent 45-35754, 58-122535 and 58-122536 and thioethers described in U.S. Pat. No. 4,126,459.

The silver halide photographic light sensitive material according to the invention is sandwiched between two sheets of high sensitive radiographic intensifying screens and exposed to X-ray. A filling ratio of a phosphor contained in a phosphor layer of the high sensitive intensifying screen usable in the invention is not less than 68%, preferably 70% and more preferably not less than 72%. The thickness of the phosphor layer is not less than 150 $\mu$m and not more than 250 $\mu$m. When the thickness is less than 150 $\mu$m, sharpness is rapidly deteriorated. It is preferred to fill the phosphor in sloped grain structure to form the intensifying screen.

Specifically, it is preferred that a phosphor with large particle size is coated in the surface protective layer-side and another phosphor with smaller particle size is coated in the support-side. The small particle size is in the range of 0.5 to 2.0 $\mu$m and larger one is 10 to 30 $\mu$m. An X-ray absorbance of the intensifying screen usable invention can be enhanced by increasing the filling ratio of the phosphor. The absorbance of X-ray is preferably not less than 30% per 100 $\mu$m of phosphor layer thickness. The absorbing amount of the intensifying screen can be measured by the following method.

The X-ray which is produced from a tungsten target tube at 80 kVp by three phase power supply is allowed to transmit through an aluminum plate with a thickness of 3 mm and reach an intensifying screen fixed at the position of 200 cm farther from the tungsten anode of the target tube. Subsequently, the amount of X-ray which is transmitted through the intensifying screen is measure at the position of 50 cm behind the screen by a ionization dosimeter.

Binders uses in the radiographic intensifying screen is preferably thermoplastic elastomer. Concretely is cited a thermoplastic elastomer selected from the group of polystyrene, polyolefin, polyurethane, polyester, polyamide, polybutadiene, ethylene/vinyl acetate copolymer, poly(vinyl chloride), natural rubber, fluorinated rubber, polyisoprene, chlorinated polyethylene, styrene-butadiene rubber and silicone rubber.

Preferred fluorescent substances used in the intensifying screen include tungstate fluorescent substances ($CaWO_4$, $MgWO_4$, $CaWO_4$:Pb); terbium-activated rare earth oxysulfide fluorescent substances [$Y_2O_2S$:Tb, $Gd_2O_2S$:Tb, $La_2O_2S$:Tb, $(Y.Gd)_2O_2S$:Tb, $(Y.Gd)O_2S$:Tb.Tm; terbium-activated rare earth phosphate fluorescent substances ($YPO_4$:Tb, $GdPO_4$:Tb, $LaPO_4$:Tb); terbium-activated rare earth oxyhalide fluorescent substances (LaOBr:Tb, LaOBr:Tb, Tm, LaOCl:Tb, Tm, GdOBr:Tb, GdOCl) and thulium-activated rare earth oxyhalide fluorescent substances (LaOBr:Tm, LaOCl:Tm); barium sulfate fluorescent substances [$BaSO_4$Pb, $BaSO_4$:$Eu^{2+}$, $(Ba.Sr)SO_4$:$Eu^{2+}$]; bivalent europium-activated alkali earth metal phosphate fluorescent substances [$(Ba_2PO_4)_2$:$Eu^{2+}$, $(Ba_2PO_4)_2$:$Eu^{2+}$]; bivalent europium-activated alkali earth metal fluorohalide fluorescent substances [BaFCl:$Eu^{2+}$, BaFBr:$Eu^{2+}$, BaFCl:$Eu^{2+}$.Tb, $BaF_2$·BaCl·KCl:$Eu^{2+}$·(Ba·Mg)$F_2$·BaCl·K Cl:$Eu^{2+}$]; iodide fluorescent substances [ZnS:Ag(Zn.Cd) S:Ag, (Zn.Cd)S:Cu, (Zn.Cd)S:Cu.Al]; hafnium phosphate fluorescent substances ($HfP_2O_7$:Cu); tantalate fluorescent substances ($YTaO_4$, YTaO4:Tm, $YTaO_4$:Nb, [Y,Sr] $TaO_4$:Nb, $GdTaO_4$:Tm, $GD_2O_3$·$Ta_2O_5$·$B_2O_5$:Tb].

EXAMPLES

The present invention will be explained based on examples, but embodiments of the invention is not limited thereto.

Example 1

Preparation of silver iodobromide hexagonal tabular grains:
Preparation of emulsion Em-1
A1
  Ossein gelatin 75.5 g
  Polypropyleneoxy-polyethyleneoxy-disuccinate sodium salt(10% ethanol solution) 6.78 ml
  Potassium bromide 64.7 g
  Water to make 10800 ml
B1
  0.7 N Silver nitrate aqueous solution 1340 ml
C1
  2.0 N Silver nitrate aqueous solution 1500 ml
D1
  1.3 N Potassium bromide aqueous solution 410 ml
E1
  2.0 N Potassium bromide aqueous solution in an amount necessary to maintain the pAg as below
F1
  Ossein gelatin 125 g
  Water 4000 ml
G1
  KSCN aqueous solution (2N) 60 ml
H1
  Silver iodide fine grain emulsion containing 3% gelatin (average grain size 0.05 $\mu$m) 0.008 mol eq.

The silver iodide fine grain emulsion (H1) was prepared in the following manner. To 6.64 l of 5.0 wt. % gelatin aqueous solution containing 0.06 mol of potassium iodide were added 2.0 l of a solution containing 7.06 mol of silver nitrate and 2.0 l of a solution containing 7.06 mol of potassium iodide over a period of 10 min, while the pH and temperature were maintained at 2.0 and 40° C. After completing addition, the pH was adjusted to 6.0.

To solution A1 were added 400 ml of solution B1and the total amount of solution D1 by the double jet precipitation method for a period of 40 sec. to form nucleus grains, with stirring at 55° C. by using a mixing stirrer as shown in examined and published Japanese Patents 58-58288 and 58-58289. After completing addition, solution F1 was added thereto and the temperature was raised to 70° C. and ripening was carried out. The remainder of solution B1 was further added for a period of 25 min., then 28% ammonium aqueous solution was added and ripening was further carried out for 10 min. After completing the ripening, the pH was adjusted with acetic acid so as to be neutral. Solutions C1 and E1 were simultaneously added at an accelerated flow rate, while being maintained at a pAg of 7.8. After adding solution C1, solutions G1 and H1 were added thereto. After being stirred for 5 min., the emulsion was desalted by the flocculation process to remove soluble salts. According to electron microscopic observation, it was proved that not less than 90% of the projected area of silver halide grains of the resulting emulsion was accounted for by hexagonal tabular grains having a maximum adjacent edge ratio of 1.0 to 2.0, the average thickness and average diameter (equivalent circle diameter of the hexagonal tabular grains being 0.20 $\mu$m and 0.80 $\mu$m, respectively. The width of grain size distribution was 15%, and an average iodide content was 0.3 mol %.

Preparation of comparative emulsion Em-2

Emulsion Em-2 was prepared in the same manner as Em-1, except that solution G1 was not added.

Subsequently, the emulsions were each divided to a given amount and the temperature was raised to 55° C. Thereafter, the compound represented formula (3) as shown in Table 2, 225 mg of 4-hydroxy-6-methyl-1,3,3a,7-tetrazaindene (TAI) and spectral sensitizing dyes (as shown in Table 2) in the form of solid particle dispersion were added thereto. Further, 10 mg of sodium thiosulfate was added, then 95 mg of ammonium thiocyanate, 12.5 mg of chloroauric acid and 2 mg of triphenylphosphine selenide as a selenium sensitizer, in the form of a solid fine particle dispersion were added, further thereto was added silver iodide fine grains of 0.2 mol %, and subsequently, ripening was carried out for 2 hr. After completing the ripening, 5 mg of 1-phenyl-5-mercaptotetrazole (PMT) and 200 mg of 4-hydroxy-6-methyl-1,3,3a,7-tetrazaindene (TAI) were added. The addition amount was expressed as per mol of silver halide.

The solid particle dispersion of the sensitizing dyes were prepared according to the method described in Japanese Patent Application 4-99437. Thus, a given amount of the sensitizing dyes was added into water previously adjusted at 27° C. and stirred by means of a high-speed stirrer (dissolver) at 3,500 rpm for 30 to 120 min. to obtain the dispersion.

The above selenium sensitized dispersion was prepared as follows. Triphenylphosphine selenide of 120 g was dissolved in 30 kg of ethyl acetate at 50° C. Separately, photographic gelatin of 3.8 kg was dissolved in water of 38 kg and further thereto was added 93 g of sodium dodecyclbenzenesulfonate 25 wt. % aqueous solution. Subsequently, these two solutions were mixed with each other and dispersed at 50° C. by a high-speed stirring type dispersing machine with a dissolver at a dispersing blade-speed of 49 m/sec. for a period of 30 min. After being dispersed, the dispersion was further stirred under reduced pressure to remove ethyl acetate until the residue of ethyl acetate reached 0.3 wt. %.

To the emulsion were added the following additives to prepare a coating solution of an emulsion layer. Coating solutions of a protective layer were also prepared, as below. Using these coating solutions, simultaneous double side coating was conducted by two slide-hopper type coating machines at a speed of 80 m/min. so that silver coverage was 1.6 g/m² of one side of a support, and coated web was dried over a period of 2 min. 20 sec. to obtain Sample 1 to 10. As a support was employed a blue-tinted polyethylene terephthalate (PET) film base for use in radiography, with a density of 0.15 and a thickness of 175 μm and having thereon a layer mainly comprising glicidylmethaacrylate-methyl methaacrylate-butyl methaacrylate copolymer (50:10:40 wt. %) and a layer mainly comprised of cross-linked gelatin. Incorporation of tin oxide in a sublayer is useful for anti-static of the photographic material.

Additives used in each layer are as follows, provided that the coating amount was expressed as per 1 m² of one side of the photographic material.

First layer (Dye layer)

Solid particle dispersion of dye (AHD) 180 mg/m²
Gelatin 0.2 mg/²
Sodium dodecylbenzenesulfonate 5 mg/m²
Compound (I) 5 mg/M²
Sodium 2,4-dichloro-6-hydroxy-1,3,5-triazine 5 mg/m²
Colloidal silica (av. size 0.014 μm) 10 mg/m²

Second layer (Emulsion layer)

(The following additives were added to the emulsion above-described.)
Compound (G) 0.5 mg
2,6-Bis(hydroxyamino)-4-diethylamino-1,3,5-triazine 5 mg/m²
t-Butyl-catechol 130 mg/m²
Polyvinyl pyrrolidone (M.W. 10,000) 35 mg/m²
Styrene-anhydrous maleic acid copolymer 80 mg/m²
Sodium polystyrenesulfonate 80 mg/m²
Trimethylolpropane 350 mg/m²
Diethylene glycol 50 mg/m²
Nitrophenyl-triphenyl-phosphonium chloride 20 mg/m²
Ammonium 1,3-dihydroxybenzene-4-sulfonate 500 mg/m²
Sodium 2-mercaptobenzimidazole-5-sulfonate 5 mg/m²
1-(p-carboxyphenyl)tetrazole 0.5 mg
Compound (H) 0.5 mg/m²
n-$C_4H_9OCH_2CH(OH)CH_2N(CH_2COOH)_2$ 350 mg/m²
COMPOUND (M) 5 mg/m²
Compound (N) 5 mg/m²
Colloidal silica 0.5 g/m²
Latex (L) 0.2 g/m²
Dextran (av. M.W. 1000) 0.2 g/m²
(Gelatin was coated so as to be 0.8 g/m², in total.)

Third layer (Protective layer-1 containing nonionic surfactant)

Gelatin 0.8 g/m²
TAI 200 mg/m²
Matting agent of polymethyl methaacrylate (area-averaged particle size 7.0 μm) 50 mg/m²
Formaldehyde) 20 mg/m²
Sodium 2,4-dichloro-6-hydroxy-1,3,5-triazine 10 mg/m²
Bis-vinylsulfonylmethyl ether 36 mg/m²
Latex (L) 0.2 g/m²
Polyacrylamide (av. M.W. 10000) 0.1 g/m²
Polyacrylic acid sodium salt 30 mg/m²
Polysiloxane (SI) 20 mg/m²
Compound (I) 12 mg/m²
Compound (J) 2 mg/m²
Compound (S-1) 7 mg/m²
Compound (K) 15 mg/m²
Compound (O) 50 mg/m²
Compound (S-2) 5 mg/m²
$C_9F_{19}$—O—$(CH_2CH_2O)_{11}$—H 3 mg/m²

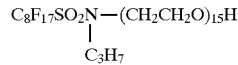

$C_8F_{17}SO_2N$—$(CH_2CH_2O)_{15}H$     2 mg/m²
    |
    $C_3H_7$

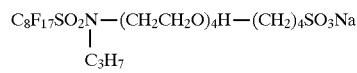

$C_8F_{17}SO_2N$—$(CH_2CH_2O)_4H$—$(CH_2)_4SO_3Na$     1 mg/m²
    |
    $C_3H_7$

-continued
Compound (G)
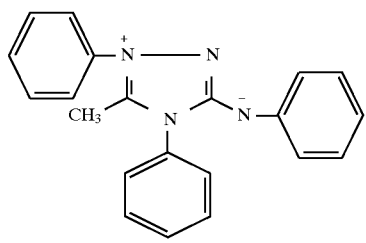
Compound (H)
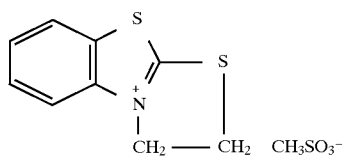
Compound (I)
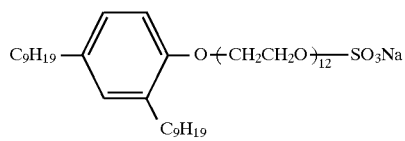
Compound (J)
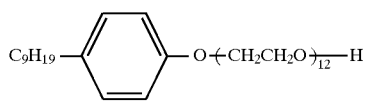
Compound (K)
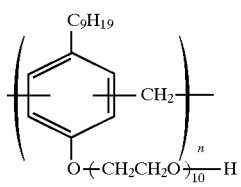
Mixture of n = 2~5
Compound (S-1)
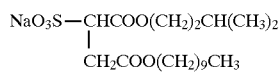
Compound (S-2)
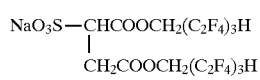
Latex (L)
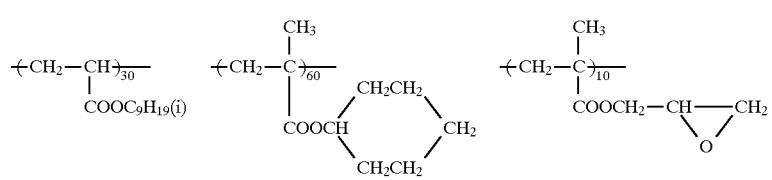
Polysiloxane (SI)

-continued
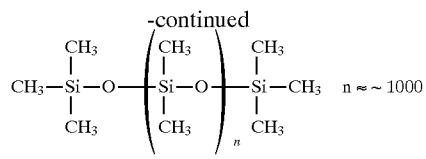
Dye in a solid particle dispersion (AH)
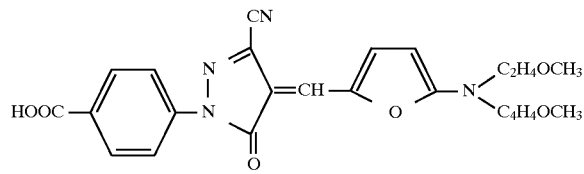
Compound (M)
Compound (N)
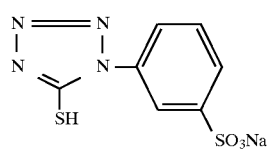
Compound (O)
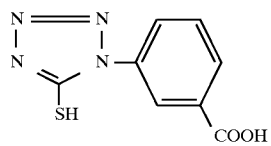
Dye 1 (Comparative dye)
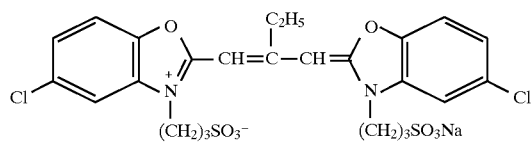
Dye 2 (Comparative dye)
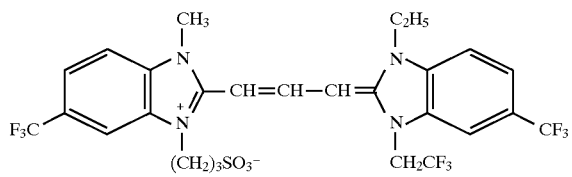
Dye 3 (Comparative dye)
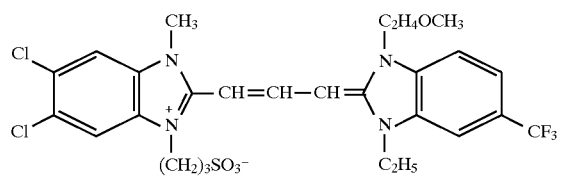
Dye 4 (Comparative dye)
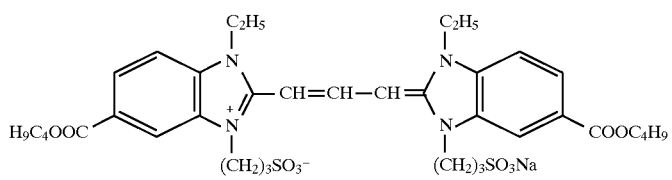

Constitution of each sample are summarized in Table 2.

TABLE 2

| Sample No. | Em- No. | Compd. of formula (3) | | Sensitizing dye | | Absorption maximum (nm) | Remarks |
|---|---|---|---|---|---|---|---|
| | | Kind | Add. amount (mg/mol AgX) | Kind | Add. amount (mg/mol AgX) | | |
| 1 | Em-1 | — | — | Dye-1 | 395 | 544 | Comp. |
| 2 | Em-1 | — | — | 1-1 | 390 | 545 | Inv. |
| 3 | Em-1 | — | — | 1-52 | 398 | 546 | Inv. |
| 4 | Em-1 | — | — | 1-7 1-5 | 192 355 | 546 | Inv. |
| 5 | Em-1 | — | — | 1-51 1-63 | 266 129 | 546 | Inv. |
| 6 | Em-1 | 3-5 | $5 \times 10^{-6}$ | Dye-1 1-5 | 40 355 | 546 | Inv. |
| 7 | Em-1 | 3-5 | $5 \times 10^{-6}$ | Dye-2 1-9 | 160 235 | 552 | Inv. |
| 8 | Em-1 | 3-5 | $5 \times 10^{-6}$ | Dye-4 1-4 | 4 365 | 548 | Inv. |
| 9 | Em-1 | 3-5 | $5 \times 10^{-6}$ | 1-7 1-14 | 192 183 | 546 | Inv. |
| 10 | Em-1 | 3-5 | $5 \times 10^{-6}$ | 1-1 | 390 | 545 | Inv. |
| 11 | Em-1 | 3-8 | $5 \times 10^{-6}$ | 1-52 | 398 | 546 | Inv. |
| 12 | Em-1 | 3-8 | $5 \times 10^{-6}$ | 1-51 1-63 | 266 129 | 546 | Inv. |
| 13 | Em-1 | — | — | Dye-4 | 398 | 578 | Comp. |
| 14 | Em-2 | — | — | Dye-1 | 395 | 544 | Comp. |

Samples 1 through 10 were each evaluated with respect to photographic characteristics. Each sample was sandwiched between intensifying screens (high sensitive screen as described below), exposed to X-ray, through an aluminum wedge, to X-ray at tube voltage of 80 kVp and tube current of 100 mA for 0.05 sec.

Preparation of high sensitive intensifying screen:

Phosphor $Gd_2O_2S$:Tb (average particle size, 1.8 μm) 200 g

Polyurethane type thermoplastic elastomer Deluxe TPKL-5-2625, solid component of 40% (product by Sumitomo Bayer Corp.) 20 g Nitrocellulose (nitration degree of 11.5%) 2 g To the above was added methylethylketone as a solvent and the mixture was dispersed with a propeller type mixer to obtain a coating solution for fluorescent substance forming layer with a viscosity of 25 ps at 25° C.

Binder/Fluorescent substance=1/22

Separately, 90 g of soft type acryl resin, 50 g of nitrocellulose were added to methylethylketone to be dispersed to obtain a dispersion with a viscosity of 3 to 6 ps at 25° C., as a coating solution to form a sublayer.

A polyethylene terephthalate base (support) compounded with titanium dioxide and with a thickness of 250 μm was horizontally placed on a glass plate and thereon was uniformly coated the coating solution of the sublayer above-described by using a doctor blade. Thereafter, the coated layer was dried with slowly increasing a temperature from 25° to 100° C. to form the sublayer on the support. A thickness of the sublayer was 15 μm.

Further thereon was coated the coating solution of the fluorescent substance in a thickness of 240 μm by using a doctor blade and dried, and subjected to compression. The compression was conducted by means of a calendar roll at a pressure of 300 kgw/cm² and a temperature of 80° C. After compression, a transparent protective layer was formed in accordance with the method described in Example 1 of JP-A 6-75097. There was thus obtained an intensifying screen with a thickness of 160 mm and a filling ratio of 68% and exhibiting sharpness (CTF) of 48%.

Using an automatic processor (SRX-502, produced by Konica), exposed samples were each processed with a developing solution and fixing solution. The developing and fixing solutions were each prepared using solid processing composition in the form of a tablet as described below. The tablets were prepared according to the following operations (A to D).

Operation (A)

3000 g of hydroquinone was ground into grain until an average grain size became 10 μm using a commercially available bandom mill. 3000 g of sodium sulfite, 2000 g of potassium sulfite and 1000 g of Dimezone were added to this powder and mixed by the mill for 30 min. After granulating the mixture by adding 30 ml of water at room temperature for 10 min., the granulated product was dried for 2 hr. using a fluidized bed dryer at 40° C. to remove moisture contained almost completely. The thus prepared granules was mixed with 100 g of polyethylene glycol 6000 using a mixer for 10 min. in a room conditioned at 25° C. and 40% R.H. Thereafter, the mixture was subjected to compression-molding on a modified tabletting machine, Tough Press Collect 1527 HU, produced by Kikusui Manufacturing Co., Ltd. to prepare 2500 tablets (A) having a weight of 3.84 g per tablet, for use as a developing-replenisher.

Operation (B)

100 g of DTPA, 4000 g of potassium carbonate, 10 g of 5-methylbenzotriazole, 7 g of 1-phenyl-5-mercaptoterazole, 5 g of 2-mercaptohypoxanthine, 200 g of KOH and N-acetyl-D,L-penicilamine were ground to form granules in a similar manner to the operation (A). After granulation, the granules were dried at 50° C. for 30 min. to almost completely remove moisture contained. Thereafter, the mixture was subjected to the compression-molding to prepare 2500 tablets (B) having a weight of 1.73 g per tablet, for use as a developing-replenisher.

Solid fixing compositions in the form of a tablet were prepared according to the following procedure.

Operation (C)

14000 g of a mixture of ammonium thiosulfate/sodium thiosulfate (70/30 by weight) and 1500 g of sodium sulfite were ground and mixed using commercially available mixing machine. Adding water of 500 ml, the mixture was granulated in a similar manner to the operation (A). After granulation, the granules were dried at 60° C. for 30 min. to almost completely remove moisture contained. Thereafter, 4 g of N-lauroylalanine was added thereto and the mixture was subjected to the compression-molding to prepare 2500 tablets (A) having a weight of 6.202 g per tablet, for use as fixed-replenisher.

Operation (D)

1000 g of boric acid, 1500 g of aluminum sulfate 18 hydrate, 3000 g of sodium hydrogen acetate (equimolar mixture of glacial acetic acid and sodium acetate) and 200 g of tartaric acid were ground and mixed in a similar manner to the above operation (A). Adding water of 100 ml, the mixture was granulated in a similar manner to the operation (A). After granulation, the granules were dried at 50° C. for 30 min. to almost completely remove moisture contained. Thereafter, 4 g of N-lauroylalanine was added thereto and the mixture was subjected to the compression-molding to prepare 1250 tablets (B) having a weight of 4.562 g per tablet, for use as fixed-replenisher.

Starter for developer:

Glacial acetic acid 2.98 g

KBr 4.0 g

Water to make 1 liter

At the time of starting processing (running process), tablets of developing compositions (A) and (B), two tablets of each were dissolved in water of 76 ml to make a developing solution. To the thus-prepared developing solution of 16.5 liters, 330 ml of afore-described starter was added to make a developer-starting solution. The pH of the developer-starting solution was 10.45.

At the time of starting processing (running process), two tablets of fixing compositions (C) and one tablet of (D) were dissolved in water of 74 ml to make a fixing solution. The thus prepared fixing solution was supplied into a fixing tank, as a starting solution.

Photographic material samples were exposed so as to give a density of 1.0 and subjected to running-processing. Processing was carried out using an automatic processor, SRX-502, which was provided with a input member of a solid processing composition and modified so as to complete processing within 15 sec. During running-processing, two tablet (A) and two tablet (B) per 0.62 m$^2$ of the photographic material were supplied to the developing solution, with 76 ml of water. When one tablet of each (A) and (B) were dissolver in water of 38 ml, its pH was 10.70. To the fixing solution, two tablets of (C) and one tablet of (D) were added with 74 ml of water. Addition of water was started at the same time of that of the tablets and continued at a constant rate further for 10 min. in proportion to a dissolving rate of the solid processing composition.

Processing condition:

| Developing: | 39° C. | 5.0 sec. |
|---|---|---|
| Fixing: | 36° C. | 3.5 sec. |
| Washing: | 35° C. | 2.5 sec. |
| Squeegee: | | 1.5 sec. |
| Drying: | 50° C. | 2.5 sec. |
| Total | | 15.0 sec. |

Each processed sample was subjected to sensitometry. The sensitivity was shown as a relative value, based on the sensitivity of Sample 1 being 100. With respect to residual color stain, spectral absorption density of each sample, which was measured at 500 nm, was referred to as degree of residual color.

Samples were also evaluated with respect to safelight safety in such a manner that a white light lamp exposed, through a red filter having transmittance as shown in FIG. 1, from the above of 1.2 m for 30 min. and an increase of fog density was measure.

The degree of residual color and safelight safety were each shown as a relative value, based on those of sample 1 being 100. The less value indicates the better. Results thereof are shown in table 3.

TABLE 3

| Sample No. | Sensitivity | Dmin | Dmax | Residual color | Safelight safety | Remarks |
|---|---|---|---|---|---|---|
| 1 | 100 | 100 | 100 | 100 | 100 | Comp. |
| 2 | 130 | 80 | 125 | 15 | 82 | Inv. |
| 3 | 113 | 94 | 123 | 44 | 87 | Inv. |
| 4 | 131 | 81 | 125 | 16 | 83 | Inv. |
| 5 | 119 | 87 | 124 | 30 | 85 | Inv. |
| 6 | 128 | 87 | 123 | 28 | 81 | Inv. |
| 7 | 131 | 80 | 124 | 24 | 89 | Inv. |
| 8 | 140 | 78 | 124 | 23 | 82 | Inv. |
| 9 | 146 | 74 | 125 | 16 | 78 | Inv. |
| 10 | 145 | 73 | 125 | 15 | 77 | Inv. |
| 11 | 125 | 86 | 123 | 44 | 81 | Inv. |
| 12 | 132 | 79 | 124 | 30 | 79 | Inv. |
| 13 | 90 | 114 | 99 | 55 | 136 | Comp. |
| 14 | 94 | 102 | 81 | 100 | 102 | Comp. |

As can be seen from Table 3, inventive samples were shown to be superior in sensitivity and safelight safety and with negligible residual color stain. The use of solid processing compositions did not deteriorate the sensitivity even when subjected to super-rapid processing of 15 sec, and there was shown no problem in residual color and safelight safety.

Example 2

Preparation of silver iodochloride tabular grain emulsion:

Preparation of emulsion Em-3

A5

Ossein gelatin 75.0 g

Potassium iodide 1.25 g

Sodium chloride 33.0 g

Distilled water to make 15000 ml

B5

Silver nitrate 410 g

Distilled water to make 684 ml

C5

Silver nitrate 11590 g

Distilled water to make 19316 ml

D5

Potassium iodide 4 g

Sodium chloride 140 g

Distilled water to make 684 ml

E5

Sodium chloride 3980 g

Distilled water to make 19274 ml

To solution A5 kept at 40° C. with stirring by a mixing stirrer as described in examined Japanese Patents 58-58288 and 58-58289 were added solution B5 and solution D5 for 1 min. The EAg was adjusted to 149 mV and Ostwald ripening was further conducted for 20 min. Thereafter, solution C5 and solution E5 were added for 320 min, while the EAg was kept at 149 mV. After completing the addition, the emulsion was desalted to obtain an Emulsion-5. Based on electron microscopic observation, it was proved that the resulting Emulsion-5 was comprised of tabular grains having (100) major faces and according for 65% of the total grain projected area, which have a average grain thickness of 0.14 μm, average grain diameter of 1.0 and a variation coefficient of grain size of 25%.

Preparation of emulsion Em-4

Emulsion Em-4 was prepared in the same manner as Em-3, except that $8 \times 10^{-6}$ mol of potassium hexachloroiridium was contained in solution E5.

Subsequently, the emulsions were each divided to a given amount and the temperature was raised to 55° C. Thereafter, $5 \times 10^{-6}$ mol of the compound represented formula (3), 3–5 and, 200 mg of 4-hydroxy-6-methyl-1,3,3a,7-tetrazaindene (TAI) were added, and spectral sensitizing dyes (as shown in Table 4) in the form of solid particle dispersion was further added thereto. Further, 10 mg of sodium thiosulfate was added, then 145 mg of ammonium thiocyanate, 18.5 mg of chloroauric acid, 15 mg of sulfur sensitizer and 3 mg of triphenylphosphine selenide as a selenium sensitizer, in the form of a solid fine particle dispersion were added, further thereto was added silver bromide fine grains of 0.5 mol, and subsequently, ripening was carried out for 2 hr. After completing the ripening, 5 mg of 1-phenyl-5-mercaptotetrazole (PMT) and 200 mg of 4-hydroxy-6-methyl-1,3,3a,7-tetrazaindene (TAI) were added. The addition amount was expressed as per mol of silver halide.

Photographic material samples were prepared in a manner similar to Example 1. The silver coverage of both side was 3.0 g/m².

TABLE 4

| Sample No. | Em- No. | Sensitizing dye Kind | Add. amount (mg/AgX mp1) | Absorption maximum (nm) | Remarks |
|---|---|---|---|---|---|
| 15 | Em-3 | Dye-1 | 390 | 458 | Comp. |
| 16 | Em-4 | Dye-1 1-1 | 55 335 | 547 | Inv. |
| 17 | Em-4 | Dye-3 1-15 | 156 234 | 548 | Inv. |
| 18 | Em-4 | Dye-4 1-7 | 5 385 | 545 | Inv. |
| 19 | Em-4 | 1-27 1-10 | 190 185 | 546 | Inv. |
| 20 | Em-4 | 1-36 | 395 | 545 | Inv. |
| 21 | Em-4 | 1-58 | 398 | 544 | Inv. |
| 22 | Em-4 | Dye-4 | 398 | 580 | Comp. |

Samples were evaluated with respect to low intensity reciprocity law failure. The samples were each sandwiched between two sheets of radiographic intensifying screens, and exposed to X-ray in an amount that gave the photographic material the same exposure as in conventional exposure, through an aluminum wedge and at a tube voltage of 60 kVp and tube current of 50 mA for 0.2 sec. Difference between sensitivity at low intensity exposure and sensitivity at conventional (higher) intensity exposure was determined. Less difference indicates less variation in sensitivity and superior characteristic. Results thereof are shown as a relative value, based on those of Sample 11 being 100.

Samples were also subjected to sensitometry in a manner similar to Example 1. The sensitivity was shown as a relative value, based on that of Sample 11 being 100.

TABLE 5

| Sample No. | Sensitivity | Reciprocity law failure | Residual color | Safelight safety | Remarks |
|---|---|---|---|---|---|
| 15 | 100 | 100 | 100 | 100 | Comp. |
| 16 | 128 | 23 | 28 | 81 | Inv. |
| 17 | 131 | 24 | 24 | 89 | Inv. |
| 18 | 140 | 24 | 23 | 82 | Inv. |
| 19 | 146 | 25 | 16 | 78 | Inv. |
| 20 | 145 | 25 | 15 | 77 | Inv. |
| 21 | 125 | 23 | 44 | 81 | Inv. |
| 22 | 102 | 105 | 30 | 139 | Comp. |

As can be seen from Table 5, inventive samples were shown to be high in sensitivity, improved in residual color stain and low intensity reciprocity law failure. It was further shown that the use of solid processing compositions did not deteriorate the sensitivity even when subjected to super-rapid processing of 15 sec, and there was no problem in residual color.

Example 3

Emulsions Em-1 and Em-4 were each chemically ripened in the same manner as Example 1, provided that spectral sensitizing dyes as shown in Table 6 were employed and in place of silver bromide fine grains, silver iodide fine grains were employed so as have a iodide content as shown in Table 6.

Samples were allowed to stand for 7 days under the following conditions A and B.

Condition A: 23° C., 55% RH

Condition B: 40° C., 80% RH

After being aged, Samples 19 to 24 were evaluated with respect to photographic characteristics. Thus, each sample was sandwiched between radiographic intensifying screens (afore-mentioned high sensitive screen), exposed, through an aluminum wedge, to X-ray at a tube voltage of 80 kVp and tube current of 100 mA for 0.05 sec. and processed by 15 sec processing system in the same manner as in Example 1.

Samples were subjected to sensitometry and the sensitivity was shown as a relative value, based on that of Sample 19 being 100. The less difference between condition A and condition B indicates that variation in sensitivity is less and superior.

Samples were also evaluated with respect to development unevenness in such a manner that a sample with a size of 35 cm×43 cm was overall exposed so as to give a density of 1.0 and processed. Processed samples were evaluated based on the following criteria:

A; No unevenness was observed

B; Unevenness was slightly observed

C; Unevenness was considerably observed

D; Overall unevenness was observed. Results thereof are shown in Table 6.

TABLE 6

| Sample No. | Emulsion No. | Sensitizing dye Kind | Sensitizing dye Add. amount | Iodide content (mol %) | Sensitivity A | Sensitivity B | Dev. unevenness | Remark |
|---|---|---|---|---|---|---|---|---|
| 23 | Em-1 | 1-1 | 390 | 2.0 | 100 | 71 | D | Comp. |
| 24 | Em-1 | 1-1 | 390 | 0.9 | 136 | 114 | B | Inv. |
| 25 | Em-1 | 1-1 | 390 | 0.3 | 145 | 140 | A | Inv. |
| 26 | Em-4 | 1-7 | 400 | 1.5 | 101 | 78 | D | Comp. |
| 27 | Em-4 | 1-7 | 400 | 0.4 | 138 | 133 | A | Inv. |
| 28 | Em-4 | 1-7 | 400 | 0.1 | 146 | 142 | A | Inv. |

As can be seen from Table 6, inventive samples were high in sensitivity, small in sensitivity variation due to processing conditions even when being aged. It was further shown that the use of solid processing compositions did not deteriorate the sensitivity even when subjected to super-rapid processing of 15 sec, and there was no problem in residual color.

What is claimed is:

1. A silver halide photographic light sensitive material comprising a support having thereon a silver halide emulsion layer comprising a silver halide emulsion, wherein said silver halide emulsion comprises silver halide grains having an average iodide content of 0 to 1 mol %, at least 50% of total grain projected area is accounted for by tabular grains having an aspect ratio of 2 to 20; and said silver halide grains being spectrally sensitized with a sensitizing dye represented by the following formula (1) or (2):

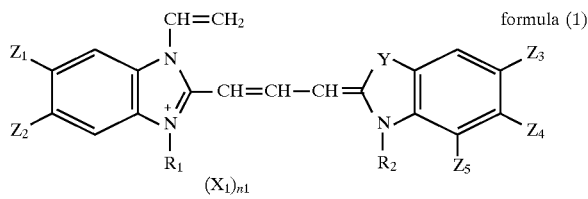

formula (1)

wherein Y represents an oxygen atom or >NR, in which R represents a lower alkyl group; $R_1$ and $R_2$ each represent a lower alkyl group, provided that at least one of $R_1$ and $R_2$ is a lower alkyl group substituted by a hydrophilic group; $Z_1$, $Z_2$, $Z_3$, $Z_4$ and $Z_5$ each represent a hydrogen atom or a substituent, and $Z_3$ and $Z_4$, or $Z_4$ and $Z_5$ may be linked to each other to form a condensed ring, provided that at least one of $Z_1$ and $Z_2$ is an electron-attracting group, $Z_3$ and $Z_4$, or $Z_4$ and $Z_5$ may be linked to each other to form a condensed ring; $X_1$ represents an ion; and n1 represents an integer of 0 or more,

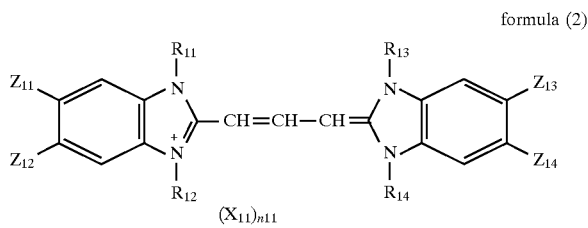

formula (2)

wherein $R_{11}$ and $R_{13}$ each represent a lower alkyl or an alkenyl group, provided that at least one of $R_{11}$ and $R_{13}$ is —CH=CH$_2$; $R_{12}$ and $R_{14}$ each represent a lower alkyl group, provided that at least one of $R_{12}$ and $R_{14}$ is a lower alkyl group substituted by a hydrophilic group; $Z_{11}$, $Z_{12}$, $Z_{13}$ and $Z_{14}$ independently represent a hydrogen atom, a halogen atom, a cyano group, an alkyl group, an alkoxy group, a halogenated alkoxy group, an aryloxy group, an acyl group, an acyloxy group, an alkylthio group, a halogenated alkylthio group, an alkoxy group, a carbamoyl group, a sulfamoyl group, a hydroxy group, a halogenated alkyl group, a carboxy group, sulfonyl group, an acylamino group, a heterocyclic group or an aryl group; $X_{11}$ represents an ion; and n1 represents an integer of 0 or more.

2. The silver halide photographic material of claim 1, wherein said silver halide grains sensitized with said sensitizing dye represented by formula (1) or (2) exhibit a spectral absorption having an absorption maximum at a wavelength of 530 to 560 nm, when its absorption spectrum is measured.

3. The silver halide photographic material of claim 1, wherein said silver halide emulsion layer contains a compound represented by the following formula (3):

formula (3)

wherein $R_{21}$ and $R_{22}$ each represent an aliphatic group, an aromatic group, a heterocyclic group, or $R_{21}$ and $R_{22}$ combine together with each other to form a ring; and m is an integer of 2 to 6.

4. The silver halide photographic material of claim 1, wherein said silver halide grains have been formed in the presence of a silver halide solvent.

5. The silver halide photographic material of claim 4, wherein said silver halide solvent is selected from the group consisting of thioethers, thioureas, compounds having a thiocarbonyl group adjoined to an oxygen or sulfur atom and a nitrogen atom, imidazoles, sulfites and thiocyanates.

6. The silver halide photographic material of claim 5, wherein said silver halide solvent is selected from the group consisting of thioethers, thioureas, imidazoles, sulfites and thiocyanates.

7. The silver halide photographic material of claim 6, wherein said silver halide solvent is a thiocyanate or tetramethylthiourea.

8. The silver halide photographic material of claim 4, wherein said tabular grains are prepared by a process comprising
   (i) forming silver halide grains by adding a silver salt and a halide salt into a reaction vessel containing a dispersion medium,
   (ii) subjecting the silver halide grains to desalting to remove soluble salts and
   (iii) subjecting the silver halide grains to chemical ripening,
wherein said silver halide solvent is added at a time during course of forming the silver halide grains in the step of (i).

9. The silver halide photographic material of claim 8, wherein in the step of (i), iodide is added in the form of a silver iodide fine grain emulsion.

10. The silver halide photographic material of claim 9, wherein said silver iodide fine grain emulsion is added after completion of adding a silver salt and halide salt.

11. The silver halide photographic material of claim 1, wherein said silver halide grains each have a chloride content of 20 to 100 mol % and contain a metal ion selected from the group consisting of iron, iridium, platinum, paradium, nickel, rhodium, osmium, ruthenium, cobalt, cadmium, zinc, mercury, lead, molybdenum, tungsten and chromium; and said tabular grains each having (100) major faces.

* * * * *